US005735034A

United States Patent [19]

Citron et al.

[11] Patent Number: 5,735,034

[45] Date of Patent: Apr. 7, 1998

[54] SYSTEM AND METHOD FOR AUTOMATICALLY PROCESSING COIN COLLECTION BOXES

[75] Inventors: Howard M. Citron, South Salem; David K. Asano, Shenorock; Henry R. Baietto, Northport; Sullivan S. Chen, Huntington, all of N.Y.; Alexis W. De Frondeville, Somerville, Mass.; Jeffrey H. Hahn, Greenwich, Conn.; Thomas J. Probst, Jr., White Plains, N.Y.; John E. Massucci, Bronx, N.Y.; Dinu Costin, Rosolyn Estates, N.Y.; Ralph E. Peragine, Massapequa, N.Y.

[73] Assignee: NYNEX Science & Technology, Inc., White Plains, N.Y.

[21] Appl. No.: 559,301

[22] Filed: Nov. 15, 1995

Related U.S. Application Data

[62] Division of Ser. No. 551,217, Oct. 31, 1995.

[51] Int. Cl.$^{6}$ .......................... B21D 39/03; B23Q 17/00; B23P 21/00

[52] U.S. Cl. .......................... 29/407.09; 29/705; 29/714

[58] Field of Search .......................... 29/407.01, 407.09, 29/705, 714, 428

[56] References Cited

U.S. PATENT DOCUMENTS

| | | | |
|---|---|---|---|
| 4,187,145 | 2/1980 | Noyes et al. . | |
| 4,536,758 | 8/1985 | Schweitzer et al. . | |
| 4,738,015 | 4/1988 | Kato | 29/407.01 |
| 5,289,634 | 3/1994 | Makino et al. | 29/407.01 |
| 5,329,691 | 7/1994 | Roberts et al. | 29/705 |
| 5,502,996 | 4/1996 | Strong et al. | 29/705 |

*Primary Examiner*—David P. Bryant
*Assistant Examiner*—Tisa Stewart
*Attorney, Agent, or Firm*—Michaelson & Wallace; Peter L. Michaelson; Jeremiah G. Murray

[57] ABSTRACT

A pipelined system for removing the contents of sealed coin-collection boxes, wherein each box requires a set of different operations to be performed in seriatim to remove the box contents. The operations include removing a seal, opening a box lid, removing the box contents, resetting the lid and resealing the box. The pipelined system comprises a rotary surface for supporting a plurality of the boxes at spaced locations. Stationary surfaces mount a plurality of box-processing units, including pneumatic actuators and processing tools, at spaced stations to form a pipeline. The processing units each perform a different one of the processing operations during each processing cycle. A motor assembly pivots the rotary surface for stepwise positioning the boxes at different ones of the stations. A control system, including computer and pneumatic systems, causes the box-processing units to perform the different processing operations simultaneously on all boxes in the pipeline. Each time that the box-processing units complete their operations, the motor assembly pivots the rotary surface, advancing the boxes along the pipeline to the next processing station, where the processing cycle repeats so that the boxes are processed in a time staggered pattern. The box-processing units, which are serially arranged and operate in parallel, include a seal-removal tool, a lid-opener tool, a box-inverter that dumps the box contents into a coin sorter/counter system, a lid-reset tool and a seal-insert tool.

23 Claims, 30 Drawing Sheets

FIG. 17
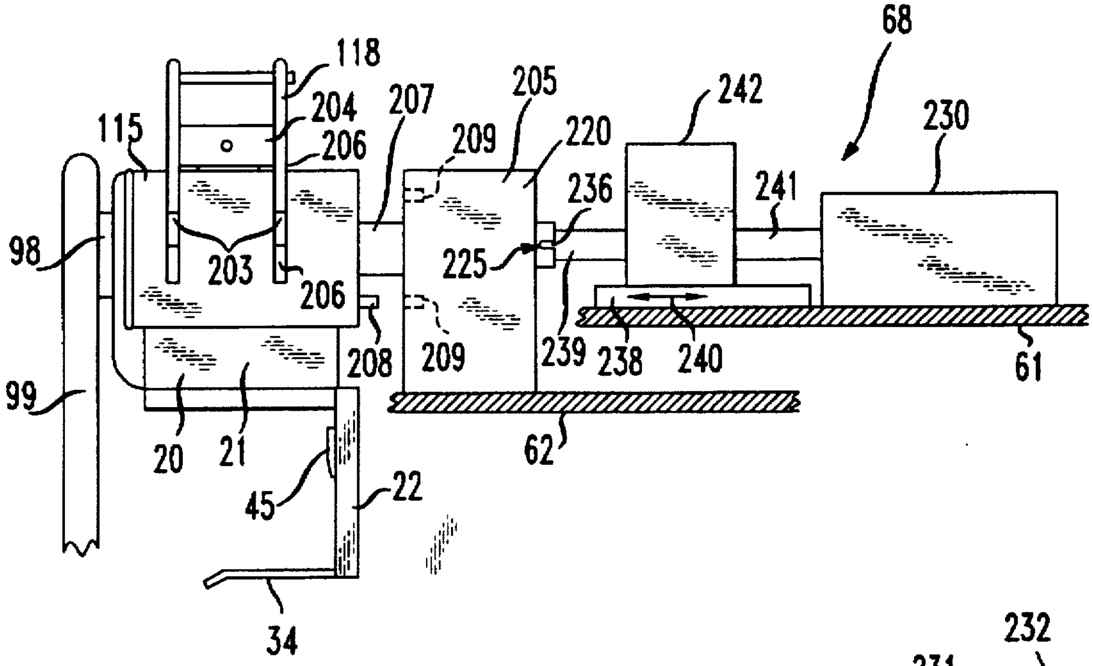
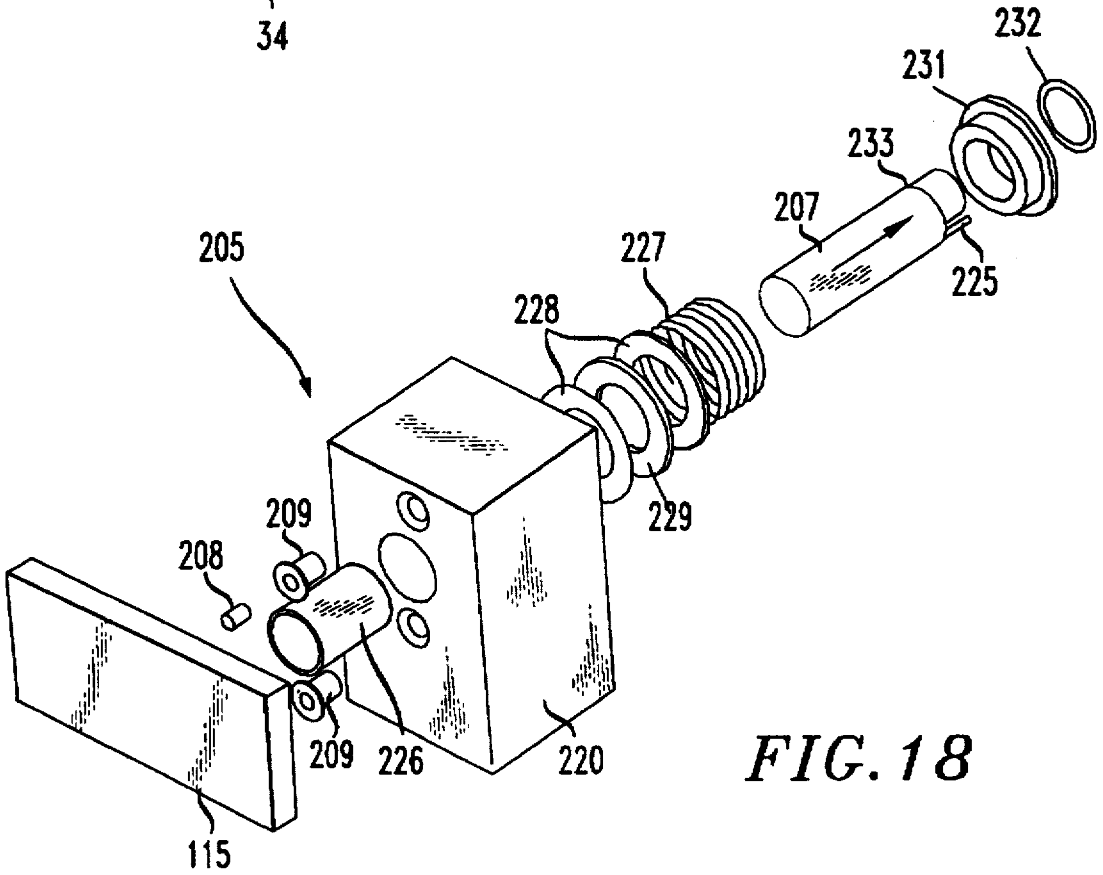
FIG. 18

FIG. 23
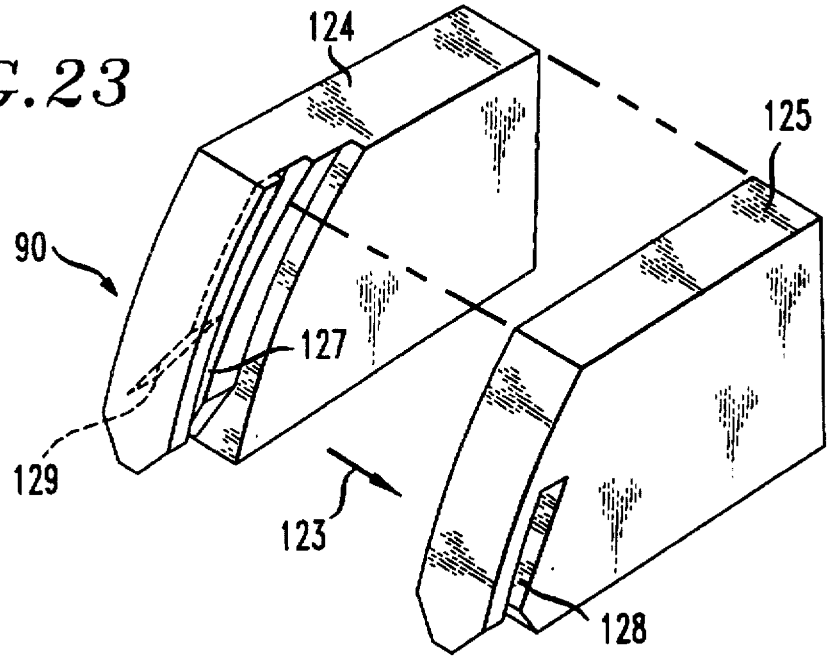
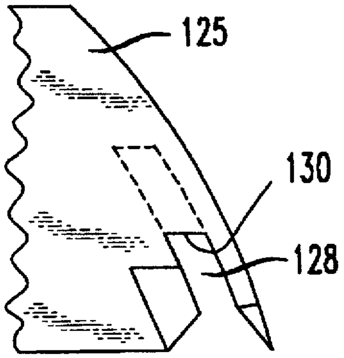
FIG. 24
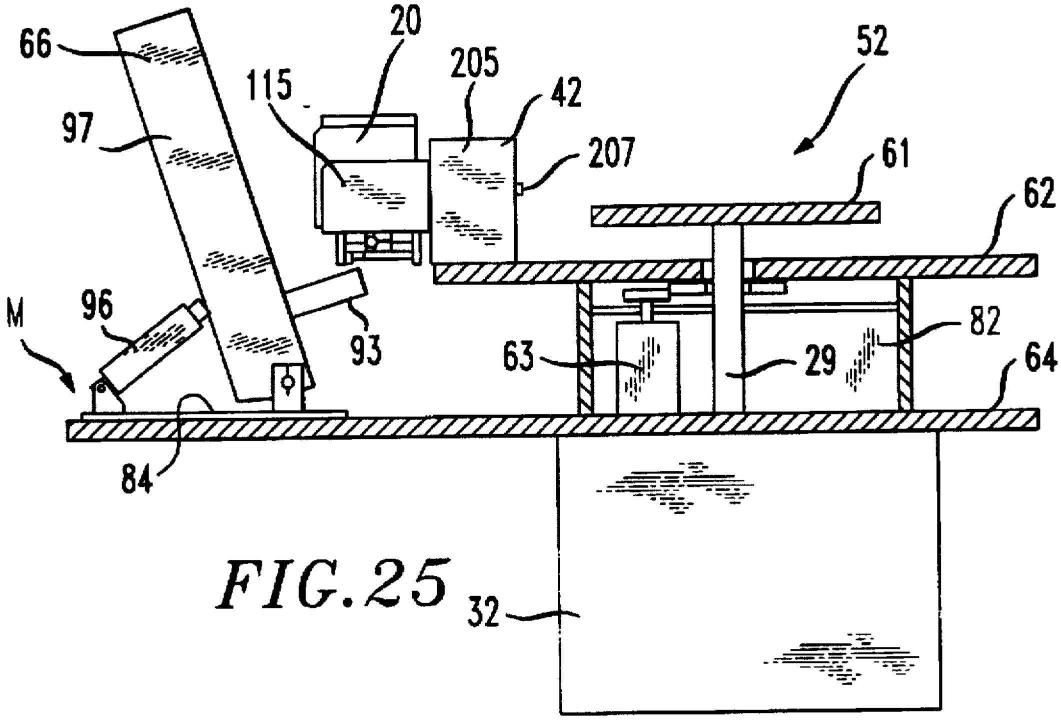
FIG. 25

*FIG. 27*
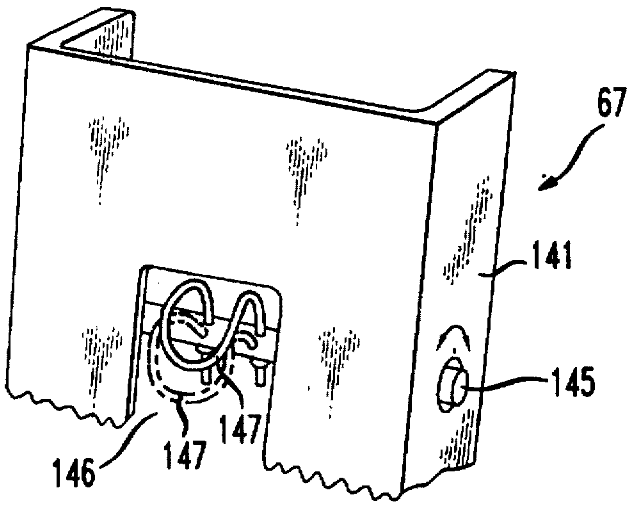
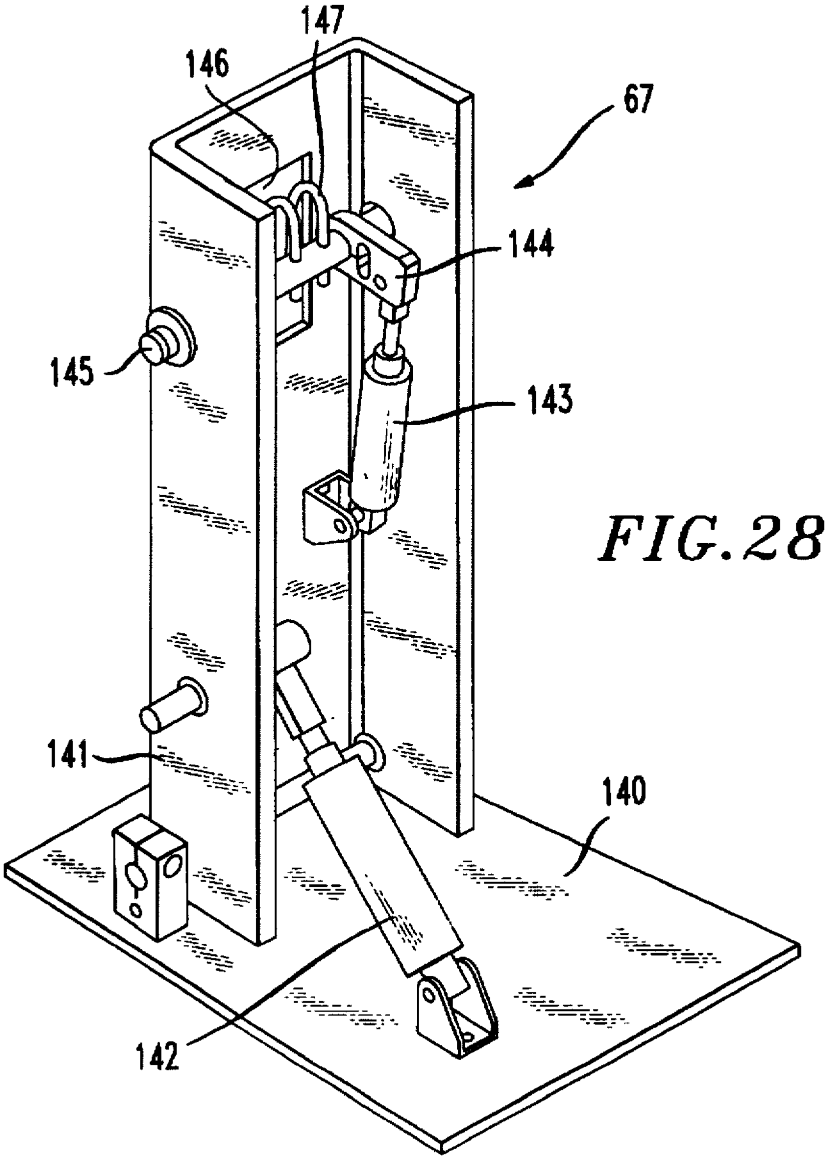
*FIG. 28*

FIG. 30
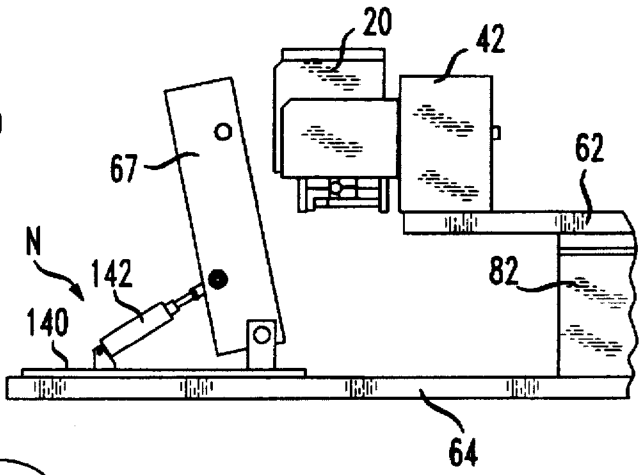
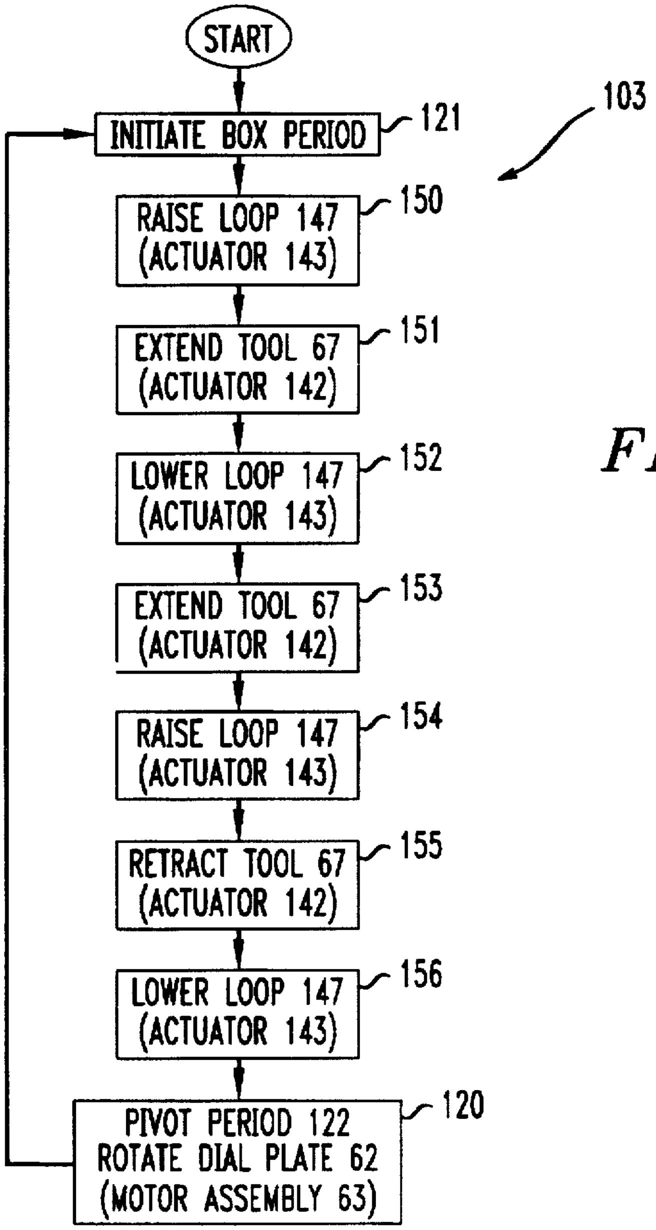
FIG. 31

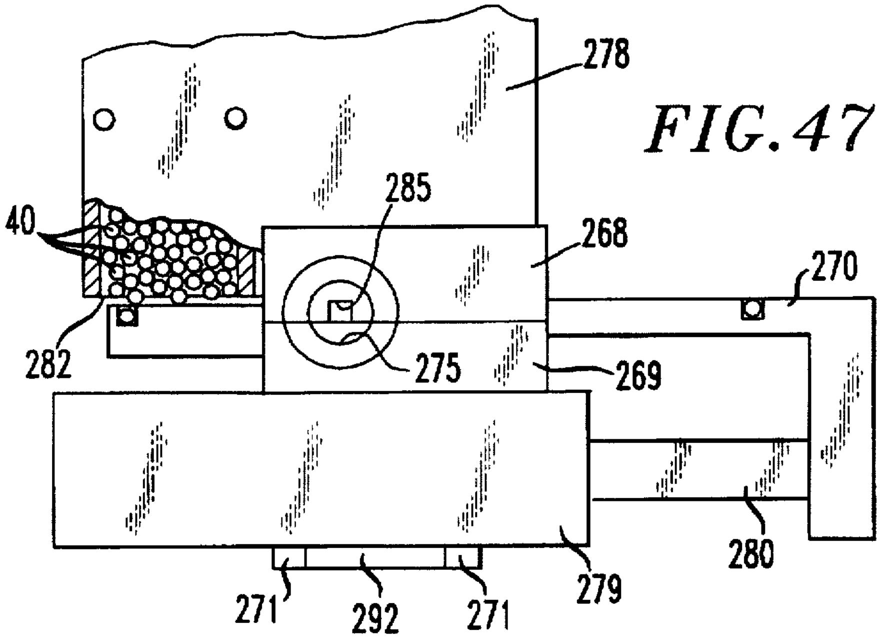
FIG. 47
FIG. 48
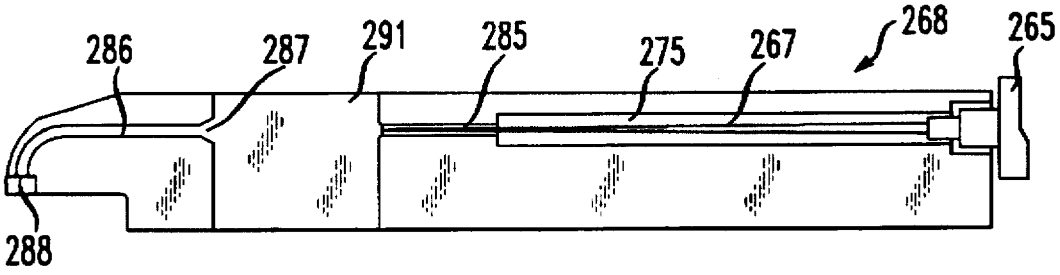
FIG. 49
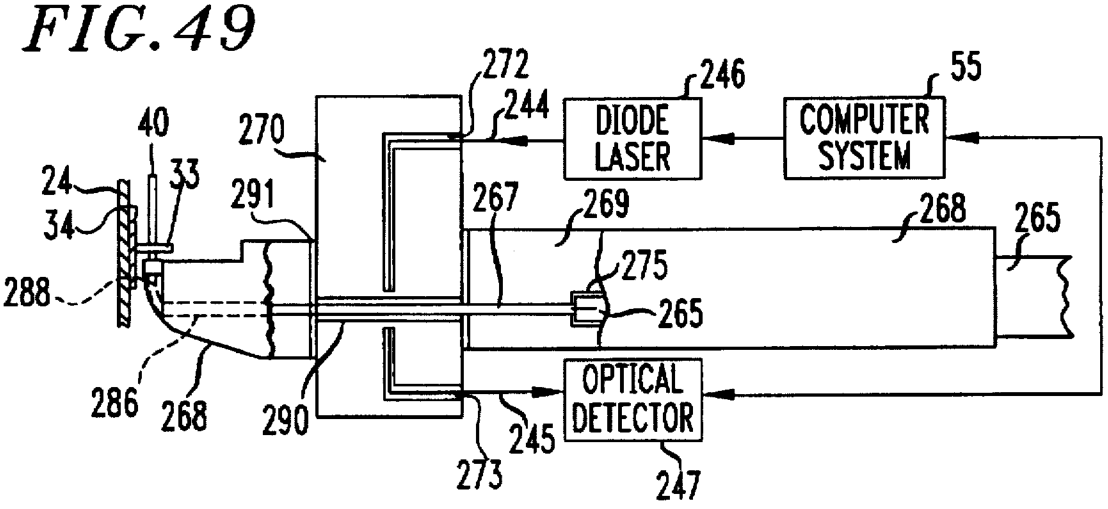

SYSTEM AND METHOD FOR AUTOMATICALLY PROCESSING COIN COLLECTION BOXES

CROSS REFERENCE TO RELATED APPLICATION

This application is a divisional of our co-pending United States patent application entitled "System and Method for Automatically Processing Coin Collection Boxes", filed Oct. 31, 1995 and assigned Ser. No. 08/551,217.

BACKGROUND OF THE INVENTION

1. Field of the Invention

The invention relates to techniques for processing coin-collection boxes, and, more particularly, to systems and methods designed to automate functions involved in collecting, sorting and counting coins accumulated in coin-collection boxes.

2. Description of the Prior Art

Prior art systems for collecting revenue from coin-operated machines usually involve elaborate processes that are highly labor intensive. For instance, collecting revenues from pay telephones generally entails a complicated process that employs numerous workers who must perform repetitive, manual tasks over long periods. Specifically, the process of collecting coins from pay telephones usually involves removing and gathering the coin boxes from the telephones, transporting the boxes to coin-collection facilities, and then distributing these boxes to operators who manually deposit the boxed coins into automatic coin-counting machines. Prior art efforts at automating various portions of this process have failed to produce a significant reduction in either the number of personnel needed to perform these coin-collection functions or the physical burdens associated with manually handling coin boxes.

More specifically, most telephone coin-collection processes begin with box collectors who manually remove coin boxes from pay telephones and replace them with new, empty coin boxes. Each collected coin box normally contains a security seal to deter tampering. The box collectors truck the sealed coin boxes either directly to a main collection center or to consolidation centers where the collected boxes are mounted on transporters for later transfer to the main collection center. Individual workers, e.g., unloaders, at the main collection centers must then hand feed the coin boxes onto conveyor systems which distribute the boxes to counting stations where other individuals here manually remove the security seals from the boxes before passing the resulting unsealed boxes to operators. Next, the operators record a box identification number on each unsealed box by, for example, scanning a bar-code label on that box. The box-processing operation requires each operator to, in seriatim, open a box lid, dump the contents of the box into a sorter/counter, reset the lid of the box, close the lid, insert a new security seal, position the box in a seal-setting device, and finally place the box on a conveyor to return it to inventory for later use by collectors during the box-collection process.

Those concerned with the development of such coin-collection processes have long recognized the need for improved techniques that simplify the manual operations involved and, therefore, substantially reduce the amount of manual labor or physical burdens needed to perform the various coin-collection functions. Although past efforts at automation have been helpful, such efforts were primarily directed to automating only relatively simple tasks with the result that the need for manual labor was not appreciably effected. For example, prior art automation systems for processing coin boxes basically entailed moving the boxes throughout the system, i.e., automatically routing the coin boxes to an operator for manual processing in a manner similar to the manual process described above. Unfortunately such coin-collecting systems have not proved entirely satisfactory in that these systems still required a considerable number of personnel to handle the coin boxes and also do not alleviate the many labor-intensive, physically burdensome and tedious manual operations heretofore associated with handling filled coin boxes. Consequently, there has been a long recognized need for improved techniques for processing coin-collection boxes.

SUMMARY OF THE INVENTION

Our present invention advantageously overcomes the deficiencies inherent in conventional automated coin-box handling systems. In general, our invention is a pipelined technique for removing the contents of coin-collection boxes, wherein the boxes require a set of different processing operations to be performed in seriatim to remove the boxed contents. Our invention includes serially arranged, pipeline processing units that simultaneously perform the different processing operations on a set of coin-collection boxes located in the pipeline. Consequently, the boxes are processed in a time-staggered fashion such that processing commences on a box before processing completes on other boxes.

Specifically, the pipelined box-processing system comprises a first member having box supports for supporting a plurality of the coin-collection boxes at spaced locations. A second member has a plurality of box-processing units mounted at corresponding processing stations spaced on the second member. The box-processing units, which each perform a different one of the processing operations, process a coin-collection box when that box is located at the corresponding processing station. A driver moves the first and second members with respect to each other for stepwise positioning the coin-collection boxes at different ones of the processing stations. A control, connected to the box-processing units, causes the units to simultaneously perform the different processing operations on the coin-collection boxes positioned at the corresponding processing stations. The control also connects to the driver for periodically repositioning the coin-collection boxes in seriatim at different processing stations such that the coin-collection boxes are processed serially by each of the processing units in a time staggered pattern.

Another aspect of our invention comprises a pipeline process for supporting a plurality of coin-collection boxes at spaced locations with respect to a plurality of box-processing units supported at corresponding processing stations. Different ones of the processing operations are performed on the boxes by the box-processing units. The boxes are positioned in a stepwise manner at different ones of the processing stations. The box-processing units simultaneously perform different processing operations on different coin-collection boxes when the boxes are positioned at each of the corresponding processing stations. The coin-collection boxes are periodically repositioned in seriatim at different ones of the processing stations such that the coin-collection boxes are processed serially by each of the processing units in a time staggered pattern.

Still another aspect of our invention comprises a system for processing coin-collection boxes that have a body, a sealed lid, a coin-receiving passage, a door for selectively closing the passage, and a one-way latch for locking the door closed. A first member has a plurality of box supports mounted at spaced points thereon. A second member has a plurality of spaced stations. An index motor moves the first member stepwise with respect to the second member such that all of the box supports simultaneously move between the stations during a series of pivot periods and simultaneously pause adjacent different ones of the stations during a series of box periods interleaved between the pivot periods. A conveyor has a system input, a system output and a member for conveying the boxes from the system input to a first one of the stations, and for conveying the boxes away from a second one of the stations to the system output. A loader, mounted at the first station, transfers one of the boxes from the conveyor to an adjacent box support during each of the box periods. A seal-removal tool, mounted at a third station, removes a security seal from the box located at the third station. A lid-opener tool, mounted at a fourth station, opens the lids on the box located the fourth station. A dump tool, mounted at a fifth station, removes the contents from the box located at the fifth station. A reset tool, mounted at a sixth station, resets the one-way latch on the box located at the sixth station. A seal-insert tool, mounted at a seventh station, inserts a seal in the box located at the seventh station. An unloader, mounted at the second station, transfers a box from the box support at the second station to the conveyor during each of the box periods. A sealer, located on the conveyor, sets the inserted seals as the conveyor conveys corresponding ones of the boxes from the second station to the system output.

Still further, in accordance with our technique, coin-collection boxes pass through a pipeline of processing units, located at spaced stations, such that each box undergoes several processing steps in a time staggered manner, but simultaneously with other boxes in the pipeline. A bar-code reader reads a bar-code label on each box just after it is loaded in the pipeline. The next station in the pipeline includes a seal-cutter tool which cuts a security seal from each box. The seal-cutter tool has a slotted cutter that moves into engagement and mates with the seal on the box. A cutting edge on the cutter shears the seal from the box.

After the seal is removed, the box moves along the pipeline to the next station where an open-lid tool opens the box lid. The open-lid tool includes a spring steel loop that captures a hasp on the lid and lifts it from a catch on the box to free the lid. With the lid open, the box moves along the pipeline to a coin-removal station where the box is inverted so that the contents of the box can fall into a trough and then into a coin sorter/counter system. The inverted box advances through the pipeline to a latch-reset tool, having a latch resetter which resets a one-way door latch that controls a door in a coin passage in the lid of the box. The latch resetter includes a mating guide and a blade that must couple with the door latch to reset the latch. The latch-reset tool includes spring-loaded supports that provide compliant movement for the latch resetter to compensate for slight variations in the shape and placement of the door latches from one box to the next.

After the latch has been reset, the box moves along the pipeline to a station where the box is turned upright, and then to a station where the lid of the box is closed and a seal-insert tool inserts a seal in a catch on the box. The seal-insert tool includes a supply of thin elongated seals that are fed one at a time into a seal dispenser. A seal inserter moves into engagement with the box and captures the catch on the box. A seal pusher pushes the seal out of the seal dispenser into the catch. The box is next packaged and passed to a seal setter which first heats the inserted seal and then sets the heated seal. Finally, the packages containing the sealed boxes are removed from the system and loaded on transporters for temporary storage and subsequent use.

BRIEF DESCRIPTION OF THE DRAWINGS

The teachings of our invention can be readily understood by considering the following detailed description in conjunction with the accompanying drawings, in which:

FIG. 17 shows a side elevation of box clamp 42 in the inverted, extended position;

FIG. 18 shows a pictorial, exploded view of a portion of box clamp 42;

FIG. 23 shows a pictorial, exploded view of a portion of seal-cutter tool 66;

FIG. 24 is a break-away, side view of a portion of seal-cutter tool 66;

FIG. 25 is a side elevation, with parts broken away and parts in section, of seal-cutter tool 66 mounted for operation in accordance with the present invention;

FIG. 27 shows a break-away, pictorial view of a portion of open-lid tool 67, of FIG. 11A, in accordance with the present invention;

FIG. 28 is a pictorial view showing the rear of open-lid tool 67 in accordance with the present invention;

FIG. 30 is a side elevation, with parts broken away and parts in section, of open-lid tool 67 mounted for operation in accordance with the present invention;

FIG. 31 is a computer flow diagram with further details of open-lid STEP 103, shown in FIG. 12, illustrating the operation of open-lid tool 67, of FIGS. 27–30;

FIG. 47 is a rear elevation with parts broken away of a portion of insert-seal tool 73;

FIG. 48 is a bottom view of a portion of insert-seal tool 73;

FIG. 49 is a top view, with parts broken away, of a portion of insert-seal tool 73 combined with other elements illustrated in schematic form;

To enhance reader understanding, identical reference numerals have been used throughout the drawings to denote elements common to the various figures.

DETAILED DESCRIPTION OF THE PREFERRED EMBODIMENT

Figure 1:
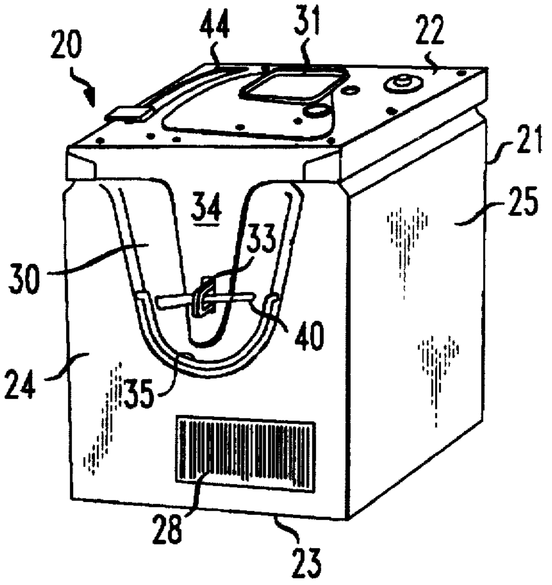
FIG. 1 (PRIOR ART)
FIG. 1 is a pictorial view of a prior art coin-collection box 20 in its closed position.

Referring now to the drawings, FIGS. 1–10 collectively show a typical prior art telephone coin-collection box 20 having body 21 and hinged lid 22. The particular configuration of box 20 is meant to be representative of conventional coin boxes designed to securely receive and hold coins deposited into coin-operated devices, such as pay telephones. While coin boxes suitable for use with the present invention may vary considerably in structure, such boxes generally have a body with a sealed lid that may be opened only by first breaking a security seal on the box. However, when properly mounted in a pay telephone, the coin box has a coin-receiving passage that is held open to permit coins deposited in the coin mechanism of the telephone to pass into the coin box. As a box collector removes the coin box from the telephone, the coin passage automatically closes and locks, thereby preventing removal of coins from the box without first breaking its security seal. Unless specifically directed to a particular figure, the reader should simultaneously refer to FIGS. 1–10 throughout the following discussion. Furthermore, for simplicity, we will discuss our invention in the context of use with coin boxes for, illustratively, coin-operated pay telephones ("pay telephones").

Figure 2:
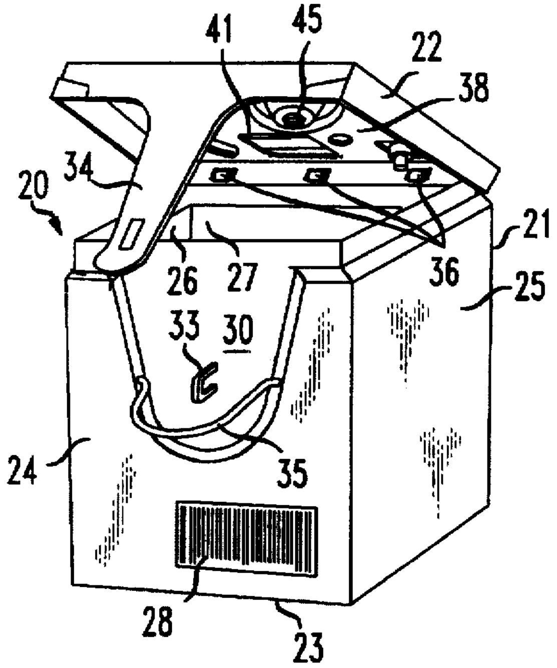
FIG. 2 (PRIOR ART)
FIG. 2 is a pictorial view of coin-collection box 20 with its lid partially open.
Figure 3:
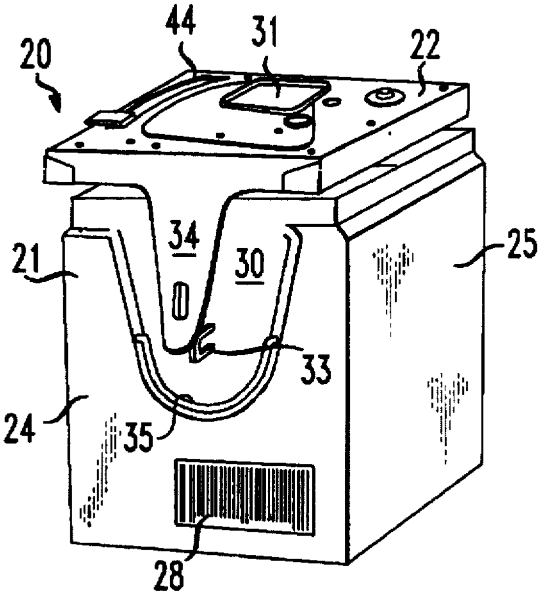
FIG. 3 (PRIOR ART)
FIG. 3 is a pictorial view of coin-collection box 20 with its lid partially open in its neutral position.
Figure 4:
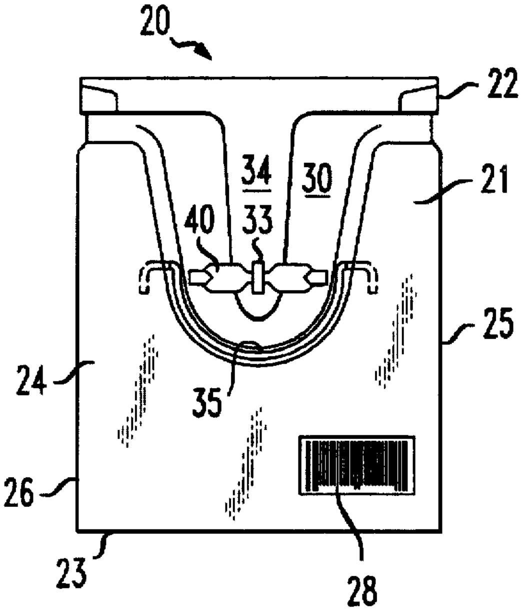
FIG. 4 (PRIOR ART)
FIG. 4 is a front elevation of coin-collection box 20 with its lid sealed in its closed position.

More specifically and as shown in these figures, body 21 of box 20 includes bottom 23, front 24, rear 27, and sides 25 and 26. Front 24 includes recessed section 30 in which annular catch 33 mounts. Bar-code label 28, which identifies box 20 by a bar-coded box identifier (bar code), also mounts on front 24. Further, U-shaped pull handle 35 hinges to front 24 and normally hangs below catch 33 in section 30 when box 20 is in its upright position as seen in FIGS. 1, 3 and 4. FIG. 2 depicts handle 35 extending away from body 21 to illustrate the usual position of handle 35 when it is being used to lift or pull box 20 from, for example, a pay telephone.

A set of three spring fingers 36 depend from the rear edge of lid 22 and pivotally mates with corresponding openings near the upper edge of rear 27 to form a hinged joint about which lid 22 is capable of being rotated with respect to body 21. Slotted hasp 34 depends from the front lower edge of lid 22. Spring fingers 36 normally hold lid 22 slightly ajar when coin box 20 sits in its upright position as seen in FIG. 3. When coin box 20 is inverted (see FIG. 8), the hinged joint, formed by spring fingers 36, permits lid 22 to freely hang below body 21. To close coin box 20, lid 22 must be forced down onto body 21, overcoming spring tension in spring fingers 36, until hasp 34 mates with annular catch 33 as seen in FIG. 1. When lid 22 is forced into its closed position, the spring tension of spring fingers 36 produces a reaction force which tends to bias lid 22 open, i.e., away from the top of body 21. That reaction force, however, presses the slot in hasp 34 into engagement with catch 33 such that the catch holds lid 22 closed. To open a closed lid 22, one must simply pull on the lower end of the relatively resilient hasp 34 until it and catch 33 decouple. When the slot in hasp 34 clears catch 33, the spring tension in spring fingers 36 forces lid 22 to pop open into its neutral position shown in FIG. 3.

The sealing of box 20 involves the steps of first closing lid 22 and then inserting a thin, rod-shaped security seal 40 into the opening in catch 33 as illustrated in FIG. 1. Next, a heater heats the inserted seal 40 to an appropriate seal-setting temperature. Finally, a seal setter presses the heated seal 40 into an enlarged shape (see FIG. 4) substantially greater than that of the opening in catch 33 so that when the enlarged seal cools it must be broken before lid 22 can be opened.

Lid 22 includes coin-collection passage 31, door 41 for selectively blocking passage 31, and a conventional one-way latching mechanism for controlling the movement and position of door 41. More specifically, cover plate 38 mounts within lid 22 to form chamber 37 in which door 41 pivots about axle 39. Concentric, rectangularly shaped openings in lid 22 and plate 38 form coin-collection passage 31. Door 41, which is spring biased into a closed position, depicted in FIG. 5, includes arm 43 which extends to the exterior of lid 22 through curved slot 44.

Conventional spring-loaded, two-state door latch 45 mounts on the underside of plate 38 for operative engagement with closure plate 41 in a manner (not shown) that is well known in these arts. Door latch 45 includes a pivot bolt 46 with an actuating slot therein. By inserting a bladed tool, such as a conventional screwdriver blade, into the actuating slot, one may pivot bolt 46 from position X to position Y—the latter shown by dashed lines (see FIG. 8). When bolt 46 is in position X, door latch 45 locks door 41 in its closed position. When bolt 46 is in position Y, door 41 may be opened via arm 43. However, when door 41 opens, door latch 45 trips, shifting bolt 46 from position Y back to position X. Consequently, once in position Y, bolt 46 can be moved back to position X only by opening and then closing door 41. Additionally, once in position X, door 41 cannot be opened until bolt 46 is rotated to position Y, which can only be done by breaking seal 40 and opening lid 22.

Door latch 45 essentially has two stable states. Its first stable state occurs when bolt 46 is in position Y. In its first stable state, door latch 45 unlocks door 41 so that the door can be freely pivoted, via arm 43, from its closed position of FIG. 5 to its open position of FIG. 6. Further, opening door 41 trips door latch 45, causing the latch to shift into its second stable state such that bolt 46 will pivot from position Y to position X when door 41 next closes. When door latch 45 is in its second stable state and door 41 closes, door latch 45 will automatically lock door 41 closed. The above-described mechanism, a conventional two-state door latch, permits passage 31 to open when box 20 is slid into an appropriate compartment of a pay telephone, but to automatically close and lock as box 20 is pulled from the compartment.

Box collectors typically receive empty coin boxes 20 from inventory with lids 22 sealed closed, as shown in FIG. 4. Also, door latches 45 are preset in their first stable state, i.e., bolts 46 are in position Y. Therefore, each box 20 comes ready for insertion into an appropriate compartment of a pay telephone. As the box collector inserts box 20 into the compartment, arm 43 engages a shoulder in the compartment that forces door 41 open, causing latch 45 to trip into its second stable state. Consequently, the box-insertion process accomplishes two goals: first, passage 31 opens so that coins can now pass into box 20 from the coin mechanism of the pay telephone; and second, door latch 45 shifts into its second stable state, i.e., bolt 46 returns to position X, readying door 41 to automatically close and lock when box 20 is later removed from the compartment. As explained above, once closed, door 41 cannot be reopened until after security seal 40 has been removed, lid 22 has been opened and door latch 45 has been reset into its first stable state by pivoting bolt 46 into position Y. In prior systems, these lid-reset functions are usually performed manually by operators after they empty the box contents into a coin-counting machine. Because the above-described one-way latching mechanism is conventional and well-known, the drawings illustrate the details of door latch 45 and its related structure only to the extent necessary to understand the present invention. Of course, the above-described one-way latching mechanism is only exemplary and represents only one type of structure suitable for use with the present invention.

Figure 10:
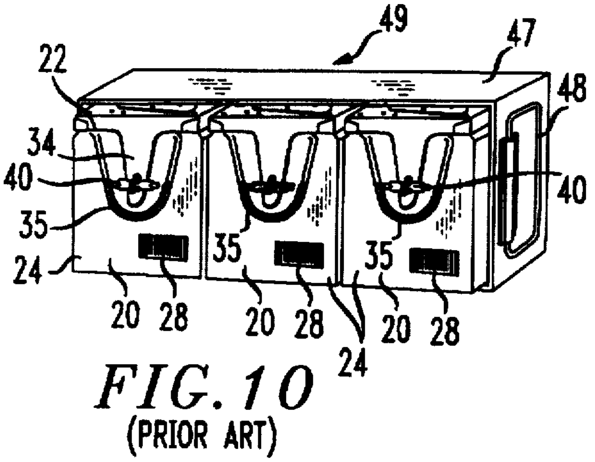
FIG. 10 (PRIOR ART)
FIG. 10 is a pictorial view of a prior art three-pack, coin-box package holding three coin-collection boxes 20.

Normally, empty coin boxes 20 ship from inventory in the manner shown in FIGS. 4 and 10, i.e., with lids 22 closed, with latch 45 in its first stable state, with security seal 40 fixed and set in catch 33, and with three empty coin boxes 20 packaged in each coin-box tray 47 to form coin-box package 49. Using tray handles 48, personnel lift coin box packages 49 onto and off of transporters and conveyor systems during the box-collection process. Boxes 20 are generally placed in trays 47 with their fronts 24 fully exposed, in the manner shown in FIG. 10, so that box collectors and operators can easily access pull handles 35 and bar-code labels 28. When collecting loaded boxes 20, box collectors usually pull these boxes from their compartments in the pay telephones using pull handles 35 and place boxes 20 in tray 47 with their fronts 24 fully exposed in the manner shown in FIG. 10.

Figure 11A:
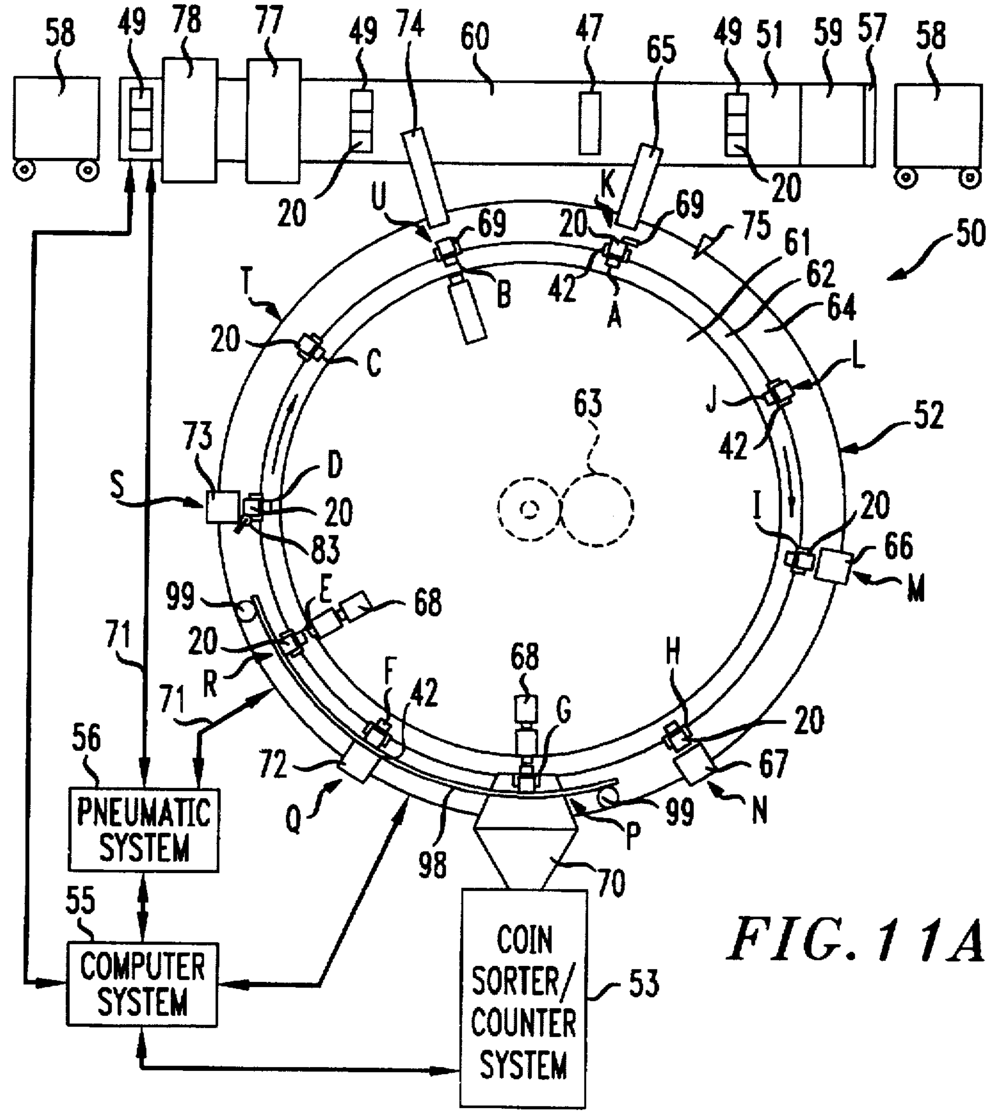
FIGS. 11A and 11B are schematic illustrations of a preferred embodiment of the present invention.
Figure 11B:
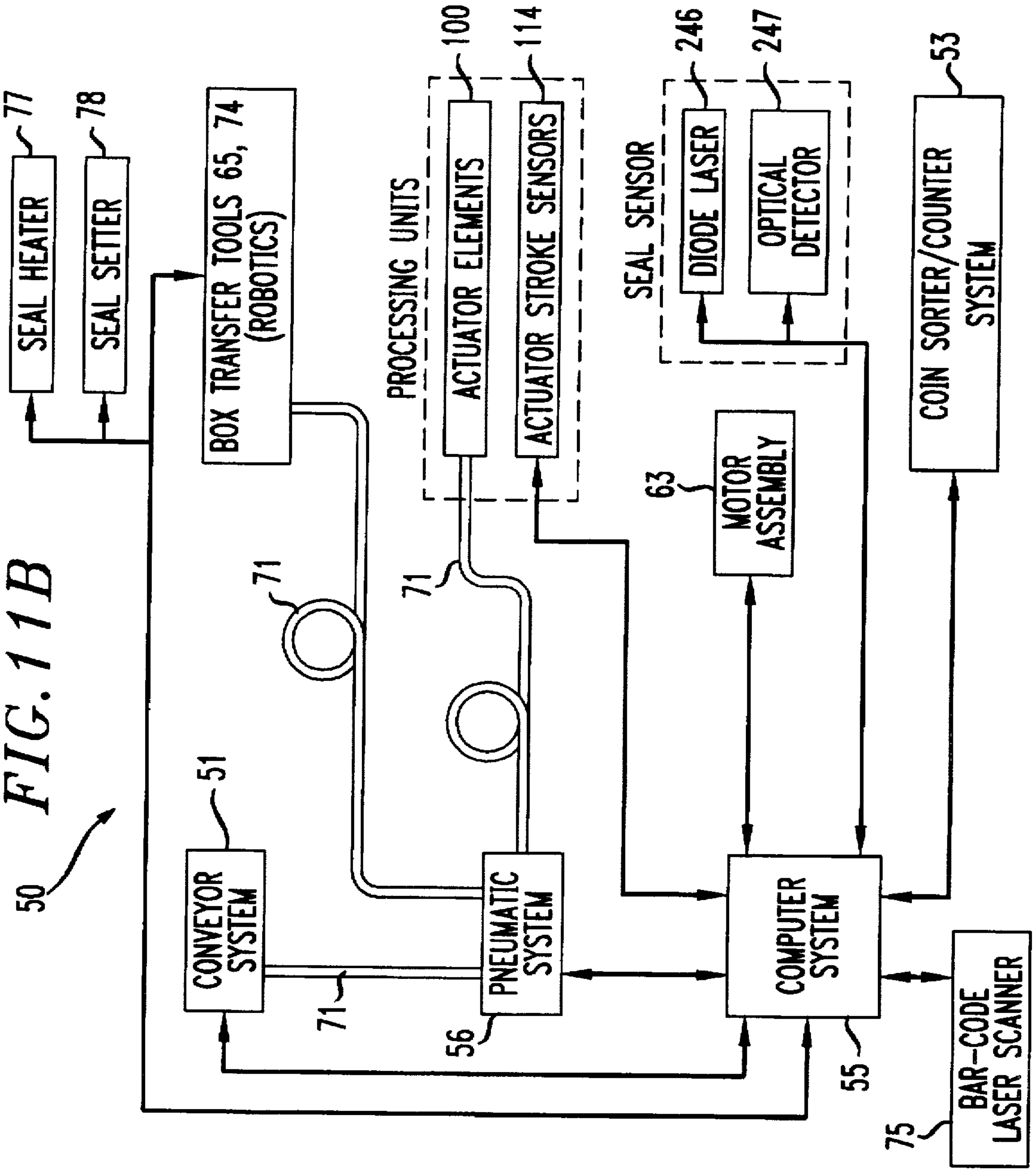
Figure 12:
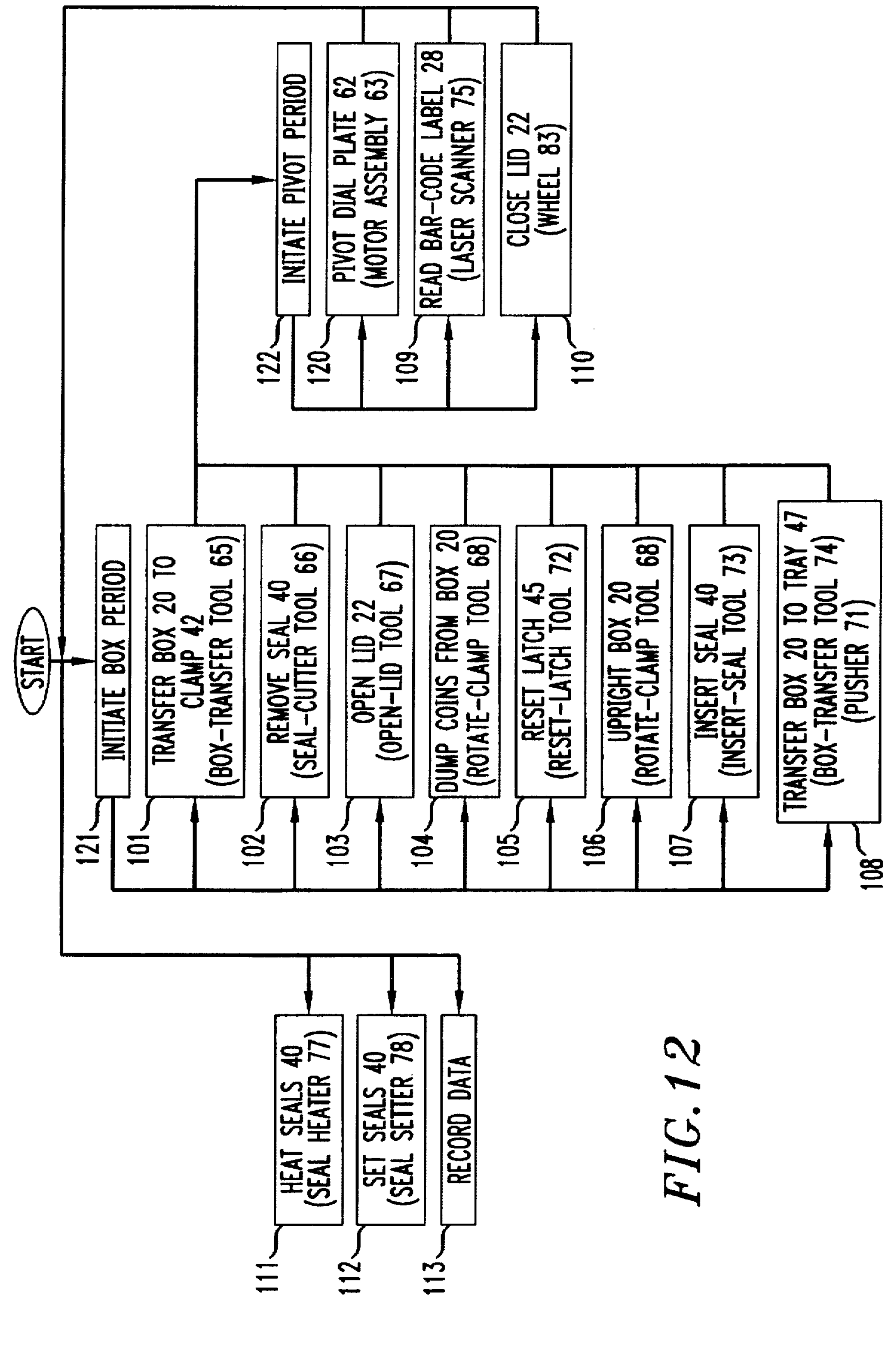
FIG. 12 is a computer flow diagram illustrating the operation of the preferred embodiment.
Figure 13:
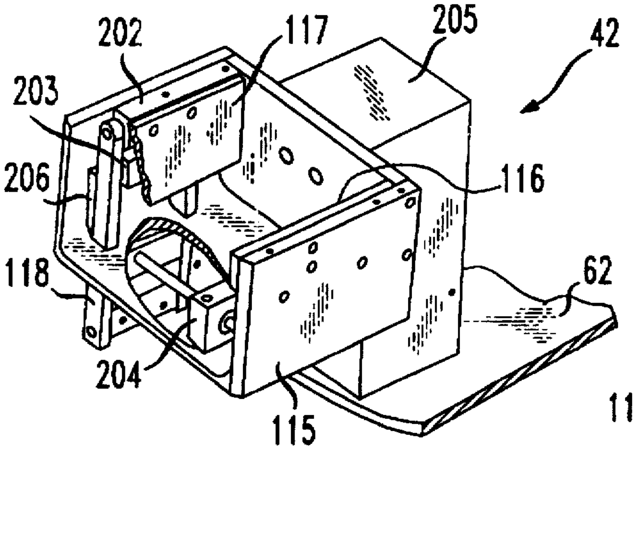
FIG. 13 is a pictorial view, with parts in section and parts broken away, showing details of box clamp 42, of FIG. 11A.

FIGS. 11A, 11B and 12 schematically illustrate a preferred embodiment of the present invention. FIGS. 11A and 11B depict coin-box-processing system 50 having structures that automate value-added activities that must be performed to process coin boxes 20 when counting revenues and handling the associated data. As discussed above, prior automatic conveying systems simply transport coin boxes 20 and their relatively heavy coin contents to various parts of a processing system. The present system performs value-added activities that can achieve significant reductions in the number of personnel required to process coin boxes. Value-added activities represent those operations that must be performed, manually or automatically, to remove the contents of coin boxes 20, to accumulate appropriate coin-collection data, and to recondition empty coin boxes 20 so that these boxes are in proper condition to be inserted back into box compartments of corresponding pay telephones. Coin-box processing system 50 performs the following value-added activities: (1) removes box 20 from coin-box package 49; (2) reads and records information contained on bar-code labels 28; (3) removes security seal 40 from catch 33; (4) opens lid 22 from its closed position to its neutral position (see FIG. 3); (5) inverts box 20 to empty its contents into a coin sorter/counter system 53; (6) sorts and counts the processed coins and records appropriate accounting data in computer system 55; (7) resets the one-way latching mechanism contained in lid 22; (8) uprights box 20; (9) forces lid 22 into its closed position; (10) inserts security seal 40 into catch 33 (see FIG. 1); (11) returns box 20 to coin-box package 49; (12) heats the inserted security seals 40; and (13) sets heated security seals 40 to their enlarged shapes (see FIG. 4).

Coin-box processing system 50, which employs a pipeline processing technique, performs most of these value-added activities in parallel during each successive processing cycle. Specifically, coin-box-processing system 50 comprises a serial arrangement of box-processing units that can perform different ones of the value-added activities listed above simultaneously on different boxes 20. As will become clear from the following description, coin-box-processing system 50 employs pipelining by having particular box-processing units commence corresponding value-added activities on different boxes 20 prior to the completion of another box 20. Consequently, different value-added activities are performed simultaneously on different boxes 20 during each processing cycle. Also, during each processing cycle, coin-box-processing system 50 removes a processed box from the pipeline, adds a new, unprocessed box to the pipeline, and advances a plurality of other boxes 20 through the pipeline by simultaneously passing these boxes from one processing unit to the next.

Coin-box processing system 50 comprises input/output conveyor system 51, box-processing assembly 52, coin sorter/counter system 53, pneumatic system 56, and computer system 55. Computer system 55 generates control signals for controlling and operating box processing assembly 52, input/output conveyor system 51, coin sorter/counter system 53 and pneumatic system 56. Pneumatic system 56 provides compressed air over pneumatic lines 71 to operate tools and actuators in system 50. Pneumatic apparatus capable of operating actuators and other mechanical apparatus, such as conveyors, pullers, etc., are well known to those skilled in these arts.

FIG. 11A shows transporters 58 supplying input/output conveyor system 51 with loaded coin-box packages 49. Transporters 58 may be implemented with prior art apparatus or with the transporter disclosed in the commonly assigned co-pending patent application of De Frondeville, et al.; "TRANSPORTER FOR STORING AND CARRYING MULTIPLE ARTICLES, SUCH AS COIN COLLECTION BOXES."

Conventional pullers 57 on input/output conveyor system 51 pull one or more coin-box packages 49 from transporter 58 and place these packages onto lift 59. Lift 59 is a conventional apparatus that lifts coin-box packages 49 onto conventional conveyor 60. Packages 49 are transported to a conventional robotics-type box-transfer tool 65. Box-transfer tool 65 is a conventional robotics device that includes sensors, grippers, flippers and pushers that lift a box 20 from its tray 47, senses the orientation of that box, reorients the box to a proper position before pushing that box, with the proper orientation shown in FIGS. 14–16, into an appropriate box clamp 42 on box-processing assembly 52. In a manner readily apparent to skilled artisans, pneumatic system 56, as shown in FIGS. 11A and 11B, and computer system 55 operate conveyor system 51 and box-transfer tool 65.

Box-processing assembly 52 comprises three tiered platforms comprising upper table 61, dial plate 62 and lower table 64. As illustrated in FIG. 25, lower table 64 mounts on fixed base 32 while column 29, fixed on lower table 64, supports upper table 61. Also, cylindrical housing 82 has an upper portion that supports dial plate 62 and rotates on a lower portion thereof. Motor assembly 63, a conventional apparatus capable of responding to computer system 55, rotates dial plate 62 in a parallel plane located between the planes of tables 61 and 64. Dial plate 62 has a diameter that is greater than that of upper table 61 and is less than that of lower table 64. Ten, equally spaced stations K–N and P–U are located about the periphery of upper table 61 and lower table 64. A set of ten, equally spaced box clamps 42, designated as box clamps A–J in FIG. 11A, mounts on the periphery of dial plate 62. Motor assembly 63 rotates dial plate 62 stepwise so that box clamps 42 move between and pause at stations K–N and P–U. For the specific orientation of dial plate 62 in FIG. 11a, clamp A is at load station K, clamp B is at unload station U, clamp C is at null station T, clamp D is at insert station S, clamp E is at upright station R, clamp F is at reset station Q, clamp G is at dump station P, clamp H is at open station N, clamp I is at cut station M and clamp J is at null station L. This relative orientation of clamps A–J with stations K–N and P–U is only one of ten possible orientations. These box-station orientations change cyclically as motor assembly 63 periodically steps dial plate 62.

Specifically, in response to computer system 55, motor assembly 63 drives dial plate 62 stepwise through angles of thirty-six degrees such that box clamps A–J sequentially pause at stations K–N and P–U during each complete revolution of dial plate 62. In a typical situation where coin-box-processing system 50 operates normally, motor assembly 63 holds dial plate 62 stationary, with clamps A–J at each of stations K–U, for relatively long periods of time called "box periods" and pivots dial plate 62 through the thirty-six degree angle during relatively shorter periods of time called "pivot periods." In this regard, it is contemplated that a box period would be in the order of twelve seconds while a pivot period would be less than a second. The combination of one box period followed by a pivot period is referred to herein as a "system period." As such, ten system periods occur for each complete revolution of dial plate 62.

Box processing units in the form of module tools and actuators mount on input/output conveyor system 51, and tables 61 and 64 to perform value-added steps during each system period. With reference to FIGS. 11A, 11B and 12, system 50 performs the following value-added steps under control of computer system 55: transfer-box STEP 101; remove-seal STEP 102; open-lid STEP 103; dump-coins STEP 104; reset-latch STEP 105; upright-box STEP 106; insert-seal STEP 107; transfer-box STEP 108; read-bar-code STEP 109; close-lid STEP 110; heat-seal STEP 111; set-seal STEP 112; and record-data STEP 113. When computer system 55 initiates a box period in STEP 121 (see FIG. 12), system 50 proceeds to simultaneously perform STEPS 101–108 on boxes 22 mounted on box-processing assembly 52, and completes these steps during the box period. It is again noted that a box period is that time period, established by computer system 55, in which dial plate 62 remains stationary and system 50 performs value-added activities, associated with STEPS 101–108, on boxes 22 mounted on box-processing assembly 52. After STEPS 101–108 conclude, computer system 55 initiates the next pivot period in STEP 122 of FIG. 12. Computer system 55 then causes system 50 to perform STEPS 120, 109 and 110. As described above, the pivot period is that period of time that computer system 55 uses for rotating dial plate 62 one thirty-six degree increment. When STEPS 120, 109 and 110 are completed and the pivot period ends, computer system 55 returns to STEP 121 to initiate the next box period, causing STEPS 101–108 to be performed on the next box 20 in the pipeline. Computer system 55 invokes STEPS 111, 112 and 113 on demand.

More specifically, in transfer-box STEP 101, box-transfer tool 65, located at load station K on lower table 64, lifts a loaded coin box 20 from a package 49 on conveyor 60 and reorients that box before pushing the box into a clamp 42 on dial plate 62. For the FIG. 11A orientation of dial plate 62, clamp A would receive box 20 from box-transfer tool 65.

In remove-seal STEP 102, seal-cutter tool 66, mounted on lower table 64 at cut station M, removes security seal 40 from coin box 20. For the FIG. 11A orientation of dial plate 62, seal-cutter tool 66 removes seal 40 for box 20 in clamp I. FIGS. 19–26 illustrate further details of the structure and operation of seal-cutter tool 66.

In open-lid STEP 103, open-lid tool 67, mounted on lower table 64 at open station N, opens lid 22 of box 20 to its neutral position (see FIG. 3). For the FIG. 11A orientation of dial plate 62, open-lid tool 67 opens lid 22 of box 20 in clamp H. FIGS. 27–31 illustrate further details of the structure and operation of open-lid tool 67.

In dump-coins STEP 104, rotate-clamp tool 68, mounted on upper table 61 at dump station P, removes the contents of box 20 by inverting the box so that the contents thereof, i.e., coins, fall into coin trough 70 and, from there, then into coin sorter/counter system 53. For the FIG. 11A orientation of dial plate 62, rotate-clamp tool 68 inverts box 20 in clamp G. FIGS. 17 and 32–36 illustrate further details of the structure and operation of rotate-clamp tool 68.

In reset-latch STEP 105, reset-latch tool 72, mounted on lower table 64 at reset station Q, resets pivot bolt 46 of the one-way latching mechanism in lid 22 of box 20. For the FIG. 11A orientation of dial plate 62, reset-latch tool 72 resets latch 45 of box 20 in clamp F. FIGS. 37–41 illustrate further details of the structure and operation of reset-latch tool 72.

In upright-box STEP 106, rotate-clamp tool 68, mounted on upper table 61 at upright station R, uprights box 20. For the FIG. 11A orientation of dial plate 62, rotate-clamp tool 68 uprights box 20 in clamp E. FIG. 17 illustrates further details of the structure and operation of rotate-clamp tool 68.

In insert-seal STEP 107, insert-seal tool 73, mounted on lower table 64 at insert station S, inserts a thin, rod-shaped security seal 40 (see FIG. 1) into catch 33 of box 20. For the FIG. 11A orientation of dial plate 62, insert-seal tool 73 inserts seal 40 in catch 33 of box 20 in clamp E. FIGS. 42–50 illustrate further details of the structure and operation of insert-seal tool 73.

In transfer-box STEP 108, pusher 76, mounted on upper table 61 at unload station U, pushes box 20 in clamp B onto box-transfer tool 74, mounted on lower table 64. Box-transfer tool 74 is a conventional robotics-type apparatus that grips box 20 and places that box into tray 47 located on conveyor 60. No operations are performed on boxes 20 when they are located at null stations L and T.

As indicated in FIGS. 11A and 12, the eight value-added STEPS 101–108 occur simultaneously on eight different boxes 20 during each box period. After system 50 successfully performs these eight value-added steps, computer system 55 initiates the next pivot period in STEP 122 and activates index motor assembly 63, in pivot STEP 120, to rotate dial plate 62 one station clockwise as viewed in FIG. 11A (see arrows on dial plate 62 in FIG. 11A). For the FIG. 11A orientation, dial plate 62 pivots one thirty-six degree increment, moving clamp A to null station L, clamp B to load station K, clamp C to unload station U, and so forth. During each rotation of dial plate 62, all clamps 42 will contain a box 20 except for the clamp 42 moving between stations U and K. As seen in the FIG. 11A orientation of dial plate 62, clamp B will be empty when moving from unload station U, where box 20 was removed, to load station K, where box 20 will be added to clamp B.

During each pivot period, two value-added activities occur. In read-bar-code STEP 109, laser scanner 75, mounted on lower table 64, reads bar-code label 28 as box 20, in clamp A for the FIG. 11A orientation of dial plate 62, moves from load station K to null station L. In close-lid STEP 110, resilient wheel 83 engages the top of lid 22 as box 20, in clamp J for the FIG. 11A orientation of dial plate 62, moves from upright station R to insert station S, forcing lid 22 closed. Wheel 83 remains in contact with lid 22, insuring that lid 22 remains closed, while insert-seal tool 73 inserts seal 40 in catch 33 during insert-seal STEP 107.

Consequently, tools and actuators mounted on box processing assembly 52 perform ten of the thirteen value-added steps, viz, STEPS 101–110, needed to process boxes 20. Input/output conveyor system 51 performs two of the remaining value-added activities. In heat-seal STEP 111, seal heater 77 heats seals 40 to an appropriate seal-setting temperature. As coin-box packages 49 move along conveyor 60, these packages come into close proximity to heating elements in seal heater 77. To conserve energy, a proximity sensor may be used to detect the presence of coin-box packages 49 while switching seal heater 77 on and off.

Figure 6:
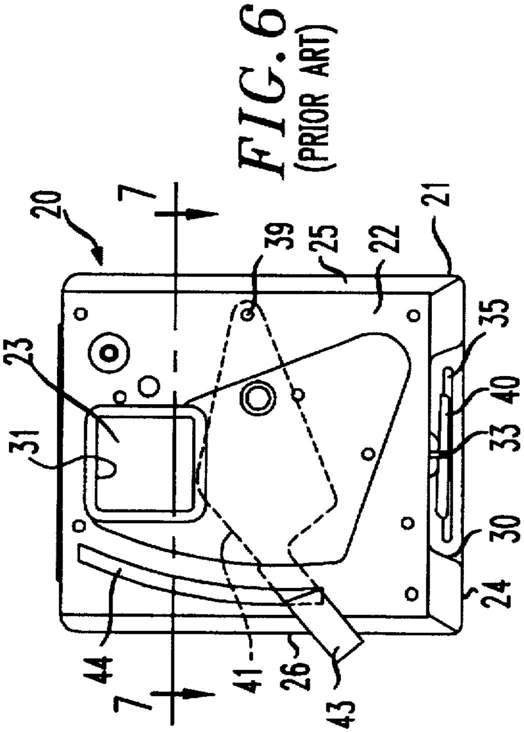
FIG. 6 (PRIOR ART)
FIG. 6 is a top view, similar to the view of FIG. 5, of coin-collection box 20 with the coin passage open.
Figure 8:
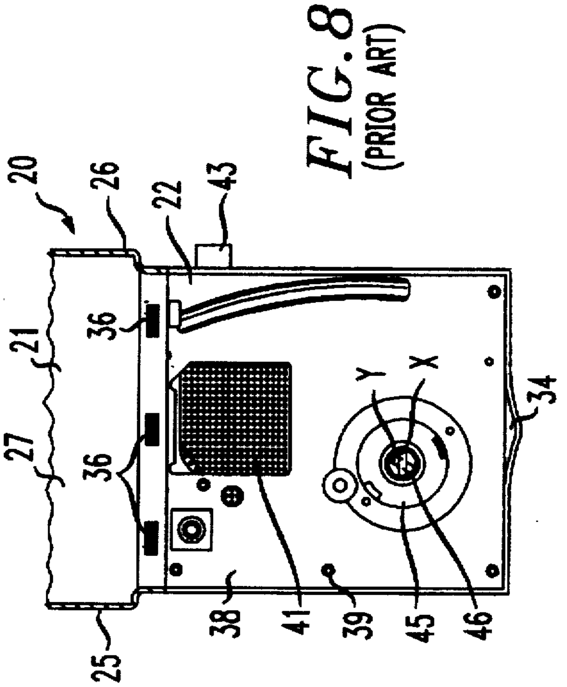
FIG. 8 (PRIOR ART)
FIG. 8 is a front cut-away view, with parts shown in cross section, of coin-collection box 20 inverted with its lid hanging below the body of the box.
Figure 5:
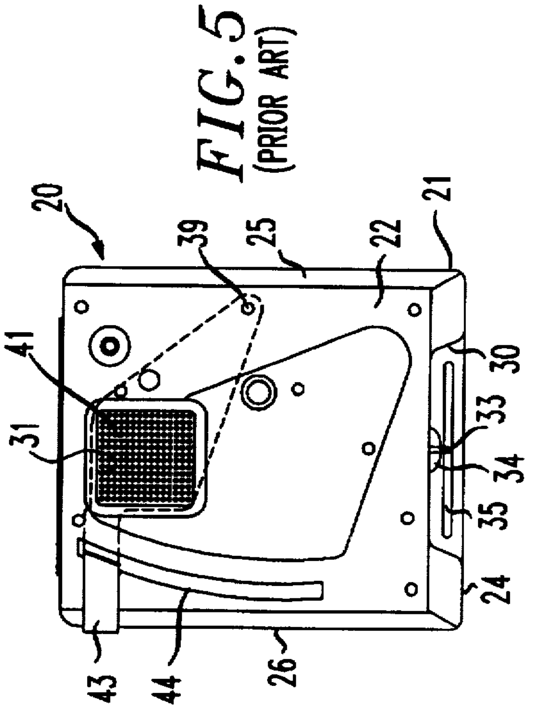
FIG. 5 (PRIOR ART)
FIG. 5 is a top view of coin-collection box 20 showing a closed coin passage in its lid.
Figure 7:
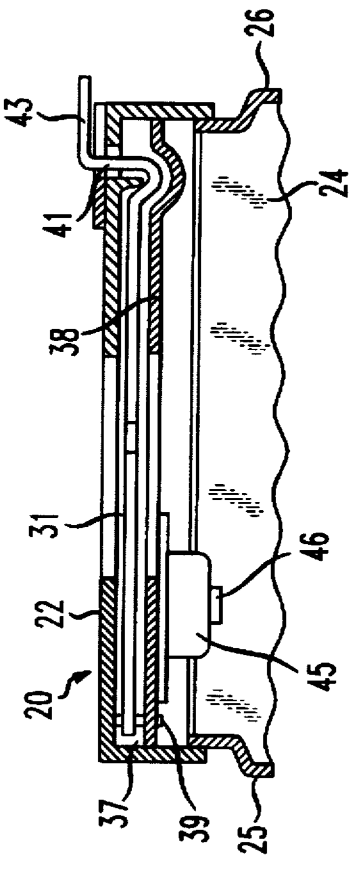
FIG. 7 (PRIOR ART)
FIG. 7 is a cross sectional, cut-away view taken along the line 7—7 of FIG. 6 and looking in the direction of the arrows.
Figure 9:
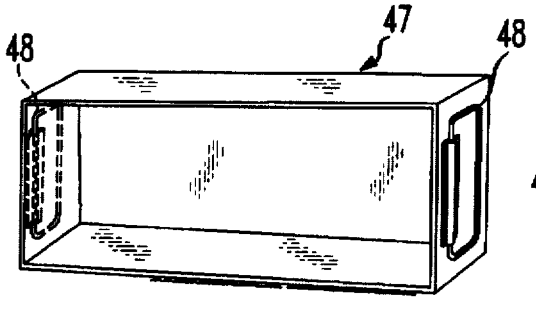
FIG. 9 (PRIOR ART)
FIG. 9 is a pictorial view of a prior art three-pack tray for holding three coin-collection boxes 20 to form the coin-box package of FIG. 10.

As coin-box packages 49 move into position below seal setter 78, conventional seal-setting fingers (not shown) engage heated seals 40, causing those seals to enlarge (see FIGS. 4, 6 and 10). After completion of set-seal STEP 112, shown in FIG. 11B, coin-box packages 49 pass to the end of conveyor 60, shown in FIG. 11A, where these packages are loaded onto transporter 58.

Finally, in record-data STEP 113, coin sorter/counter system 53 and computer system 55 perform the thirteenth value-added activity. While coin sorter/counter system 53 sorts and counts the processed coins deposited into trough 70, computer system 55 records the appropriate accounting data and, at an appropriate time, updates remote accounting data bases with appropriate information, such as, time since the last update, accumulated coin count, box identification numbers, counted boxes, and the coin count for each such box. In as much as these updating operations are conventional in nature, they will not be addressed in any greater detail herein.

As mentioned above, box-processing assembly 52 performs value-added activities in a pipelining fashion, i.e., before completing the processing of each box 20, value-added activities are commenced on subsequent boxes 20. Box-processing assembly 52 essentially has a throughput of one box 20 per system period, with each of these boxes having ten value-added activities performed thereon. Consequently, ten different coin boxes 20 are unloaded, at unload station U, for each revolution of dial plate 62. This assumes, of course, that there are no delays in inputting boxes 20 to the pipeline, i.e., input/output conveyor system 51 receives sufficient coin-box packages 49 from transporters 58 to permit boxes 20 to be continuously fed to load station K.

FIGS. 13–18 illustrate box clamp 42 in further detail. For enhanced understanding, the reader should simultaneously refer to all of these figures (in the absence of reference to a specific figure) throughout the following discussion. Body 115 of box clamp 42 houses opposed friction pads 116 and 117. One side of body 115 supports friction pad 116 while the opposed side mounts friction pad 117. Pivoted lever arm 118 pivotally attaches to friction pad 117 via pivot bracket 202, and to body 115 via pivot bracket 203. Lever arm 118 extends downwardly, to the underside of clamp 42, through slots 206 in body 115. One end of spring assembly 204 attaches to lever arm 118 while the other end of this assembly attaches to the underside of body 115. Consequently, spring assembly 204 biases lever arm 118 such that friction pad 117 is biased toward friction pad 116.

Figure 14:
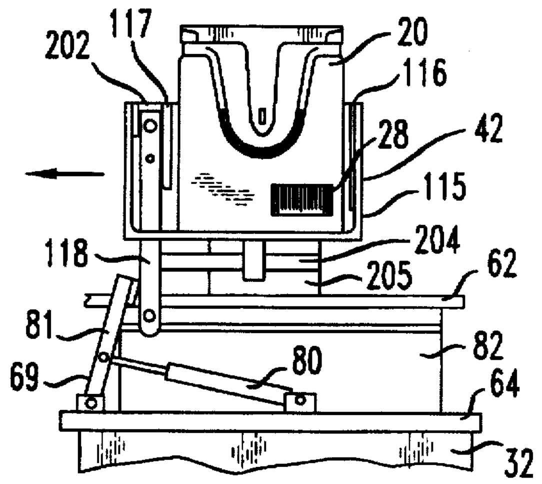
FIG. 14 shows a front elevation of box clamp 42 in its open position.
Figure 15:
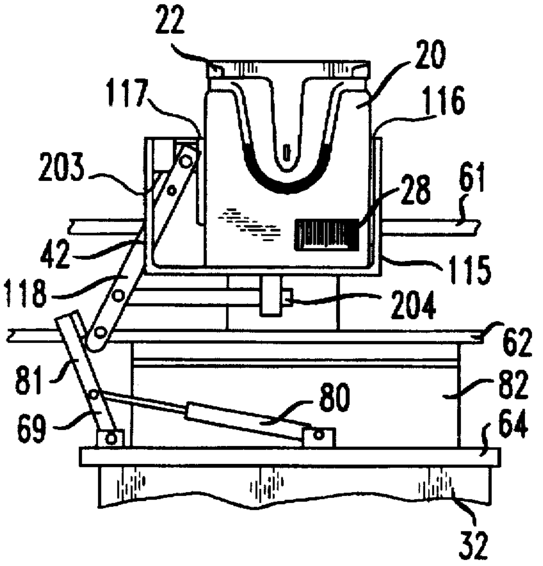
FIG. 15 shows a front elevation of box clamp 42 in its closed position.

FIGS. 14 and 15 illustrate clamp 42 in its open and clamping positions, respectively. Clamp openers 69 mount on lower table 64 at stations K and U (see FIG. 11A). Each clamp opener 69 includes pneumatic actuator 80 operatively connected to pivot arm 81. Operation of actuator 80 selectively rotates arm 81 into and out of engagement with lever arm 118 of clamp 42. When arm 81 engages lever arm 118, friction pad 117 moves in a direction away from friction pad 116, indicated by an arrow in FIG. 14, thereby releasing box 20 or providing room for the insertion of box 20 into clamp 42. When arm 81 disengages lever arm 118, spring assembly 204 biases friction pad 117 toward friction pad 116, thereby firmly clamping box 20.

As indicated in FIG. 11B, coin-box-processing system 50 employs conventional linear and rotary actuators which themselves have actuator elements 100 that operate in response to pneumatic pulses provided by pneumatic system 56. Such conventional actuators come equipped with stroke sensors 114 that provide electric feedback pulses to indicate whether or not the actuator has properly responded to the pneumatic pulses. Computer system 55 senses these feedback pulses and takes appropriate action in response thereto. The operation of these conventional actuators in the present system will become readily apparent to those skilled in the art from the following description, thereby avoiding the need for any explicit description thereof.

Figure 16:
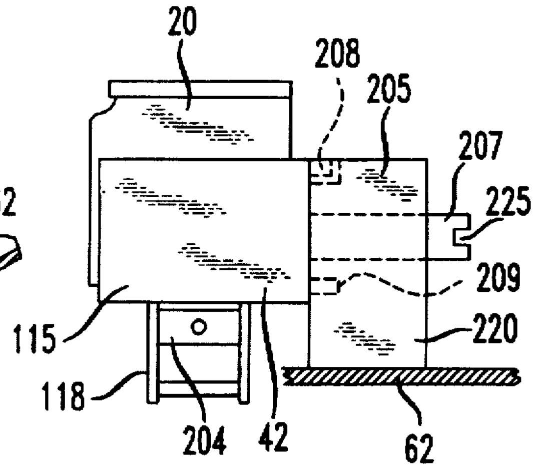
FIG. 16 shows a side elevation of box clamp 42.

FIG. 18 illustrates clamp-pivot assembly 205 in greater detail. Clamp-pivot assembly 205 mounts on the periphery of dial plate 62 (see FIG. 17). As shown in FIG. 18, clamp-pivot assembly 205 includes actuating bolt 207 with actuating slot 225 formed in one end thereof. The other end of this bolt attaches to a rear wall of clamp body 115. Bolt 207 pivots in bearing 226 which is fixed in housing 220. Coiled compression spring 227, washers 228 and trust bearing 229 successively fit over bolt 207. Retaining ring 232 fits into annular slot 233 to hold spring retainer 231 on bolt 207. Spring retainer 231 and washer 228 bear on opposite ends of compression spring 227, thereby causing spring 227 to bias bolt 207 such that the rear wall of body 115 engages housing 220, as shown in FIG. 16. Locking detent 208, shown in FIGS. 17 and 18, mounts on the rear wall of body 115 and cooperates with two sockets 209 which are inset in body 220. Sockets 209, detent 208 and spring 227 cooperate to normally lock clamp 42 in either its upright position, as seen in FIGS. 14–16, or in its inverted position, as shown in FIG. 17.

FIG. 17 also illustrates pivot-clamp tool 68 engaged with bolt 207 of pivot assembly 205 such that detent 208 is disengaged from sockets 209 and clamp 42 is inverted. Pivot-clamp tool 68 includes linear actuator 230 having plunger 241 which attaches to a slidable rack-and-pinion actuator 242, having rotatable shaft 239 with end 236 shaped to operatively couple to bolt 207 via actuating slot 225 (see PIG. 18). Rotary actuator 242, which mounts on slidable bearing 238, glides back and forth in the directions of double-headed arrow 240 as actuator 230 extends and retracts plunger 241. Pivot-clamp tool 68 pivots clamp 42 by first extending actuator 230 and, therefore, rotary actuator 242 such that end 236 couples to slot 225 on the end of bolt 207. As actuator 230 fully extends, shaft 239 pushes bolt 207 axially to cause clamp body 115 to decouple from housing 220 as detent 208 leaves hole 209 (e.g., see the extended position of clamp 42 in FIG. 17). Thereafter, pivot-clamp tool 68 completes the clamp pivot when actuator 242 rotates shaft 239, such that bolt 207 rotates clamp 42 to the desired position, i.e., either the inverted position (see FIG. 17) or the upright position (see FIG. 16). When the desired clamp position is reached, actuator 230 retracts plunger 241, sliding rotary actuator 242 on bearing 238 such that clamp 42 moves toward housing 220, detent 208 nests within the appropriate hole 209, and end 236 of shaft 239 and slot 225 in bolt 207 decouple.

Figure 39:
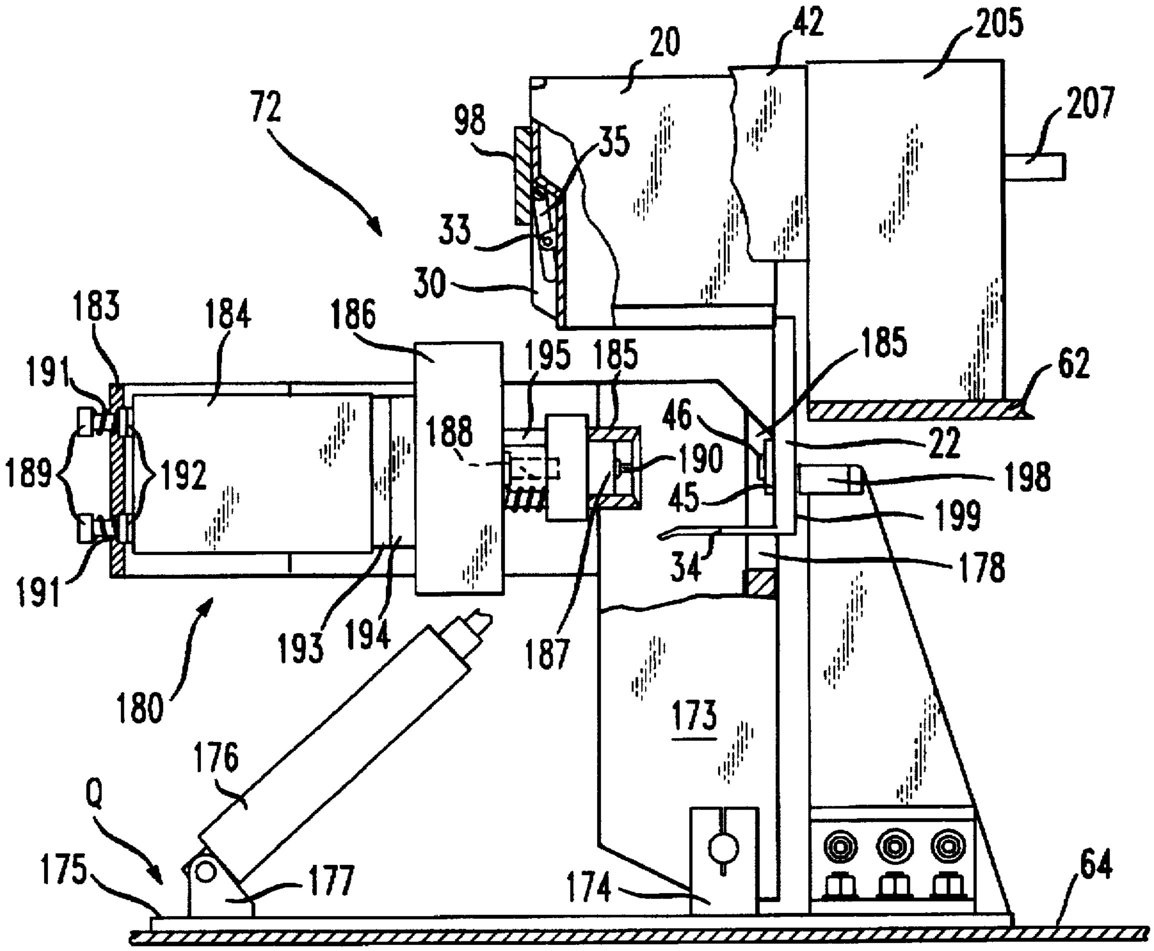
FIG. 39 is a side elevation, with parts broken away and parts in section, of reset-latch tool 72, in which the tool is in its extended position and the reset driver is in its retracted position.
Figure 40:
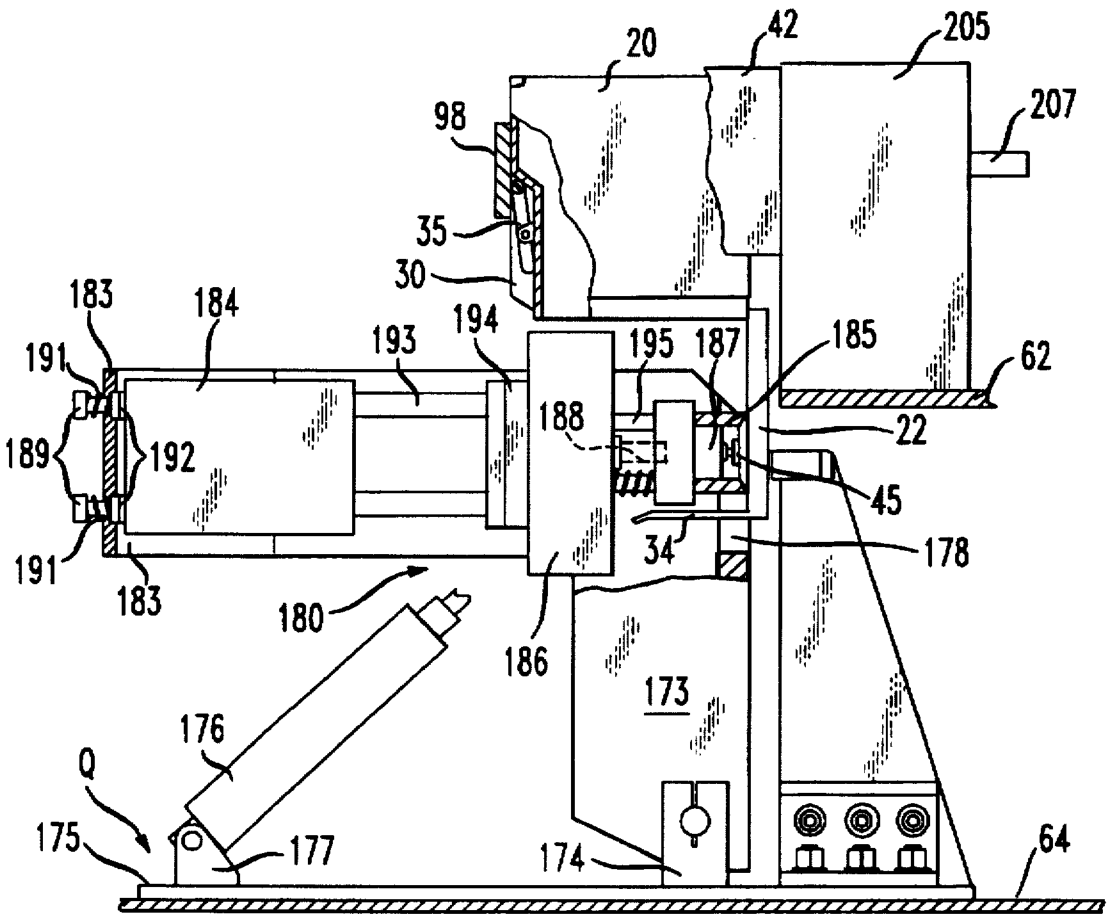
FIG. 40 is a side elevation of reset-latch tool 72, similar to the view of FIG. 39, showing the reset driver is in its extended position.

In addition to lid 22 hanging down when box 20 is inverted, as seen in FIG. 17, box handle 35 can also swing down. An inversion of handle 35, if allowed to occur, can cause a problem when box 20 rotates to the upright position, i.e., when pivot-clamp tool 68 at upright station R (see FIGS. 1 and 11A) uprights box 20. As box 20 turns upright, lid 22 will normally flip down onto body 21. However, in many situations, lid 22 will rotate down onto body 21 faster than handle 35 can flip to the down position and clear a path for hasp 34. As such, handle 35 often sandwiches between hasp 34 and front 24 in section 30 as box 20 turns to its upright position. To avoid this potential problem, system 50 includes resilient fence 98 (see FIGS. 11A and 17) fixed on posts 99, mounted on lower table 64. Fence 98 extends from a point just before dump station P to a point just after upright station R. Fence 98 mounts in close proximity to box front 24 and spans a path that handle 35 tracks as box 20 moves from dump station P to upright station R. Consequently, fence 98 acts as a barrier, confining handle 35 to section 30 and thereby preventing the handle from swinging down when pivot-clamp tool 68 at dump station P inverts box 20. Consequently, handle 35 inverts with box 20. FIGS. 39 and 40 illustrate handle 35 being confined to recessed section 30 by fence 98.

FIGS. 19–25 illustrate seal-cutter tool 66 in greater detail. For enhanced understanding, the reader should refer to all these figures throughout the following discussion.

Seal-cutter tool 66 has base plate 84 which mounts on lower table 64 at cut station M. Base plate 84 supports pivot brackets 85 and 86. Brackets 85 pivotally mount one end of tool channel 97. Bracket 86 pivotally mounts one end of pneumatic actuator 96 while axle 87 pivotally connects the other end of actuator 96 to tool channel 97. Axle 88 pivotally connects cutter arm 89 to tool channel 97. An upper end of cutter arm 89 holds slotted cutter 90 which extends into access opening 91 of tool channel 97. A lower end of cutter arm 89 pivotally attaches to plunger 92 of pneumatic actuator 93 via axle 95. The cylinder of actuator 93 pivotally mounts to the operative side of tool channel 97 via axle 94.

FIGS. 23 and 24 specifically show details of slotted cutter 90, formed from two parts 124 and 125 which are joined together and attach to the upper end of cutter arm 89. FIG. 24 illustrates a break-away view that looks at a hidden surface of a portion of part 125 as indicated by arrow 123 in FIG. 23. Parts 124 and 125 form slot 126 for capturing catch 33 during seal removal. Parts 124 and 125 also include slots 127 and 128, respectively, for receiving seals 40 during seal removal. Slots 127 and 128 terminate in sharp edges 129 and 130, respectively.

Figure 26:
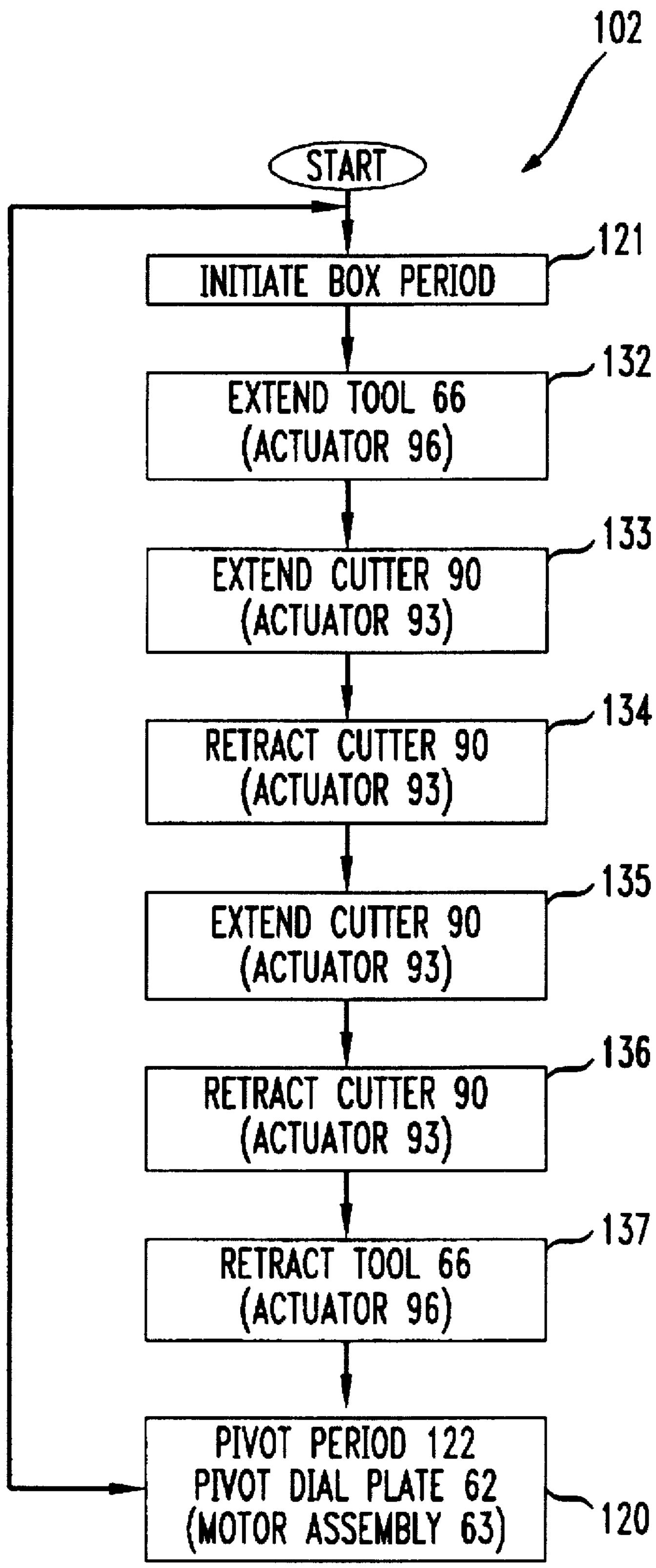
FIG. 26 is a computer flow diagram with further details of remove-seal STEP 102, shown in FIG. 12, and illustrating the operation of seal-cutter tool 66, of FIGS. 19–25.
Figure 29:
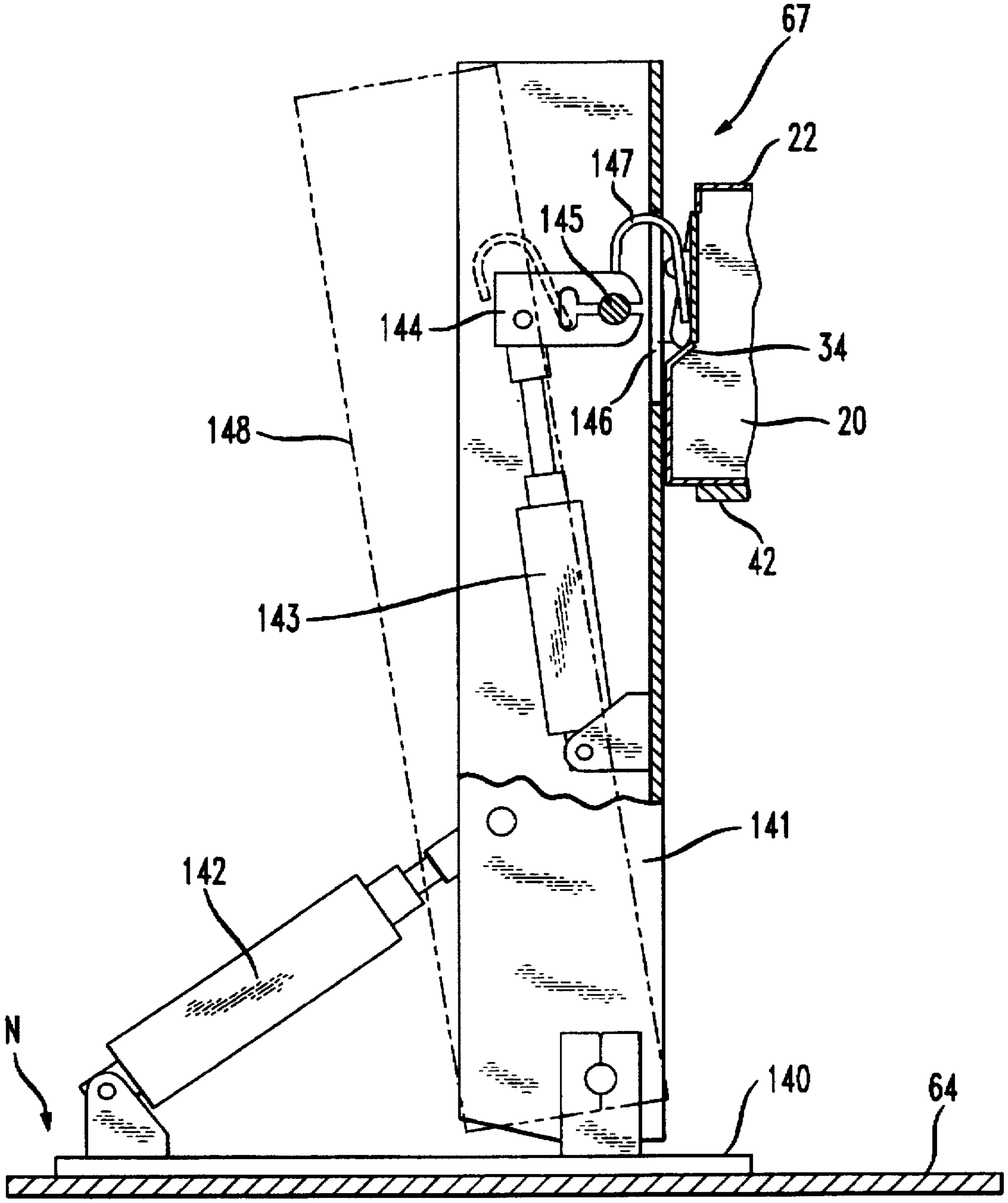
FIG. 29 is a side elevation, with parts in section and parts broken away, of open-lid tool 67.

The FIG. 26 process flow diagram, which depicts detailed steps for remove-seal STEP 102 of FIG. 12, reveals the functions of seal-cutter tool 66. The reader should refer to FIGS. 20, 22, 23, 25 and 26 throughout the following discussion.

Figure 20:
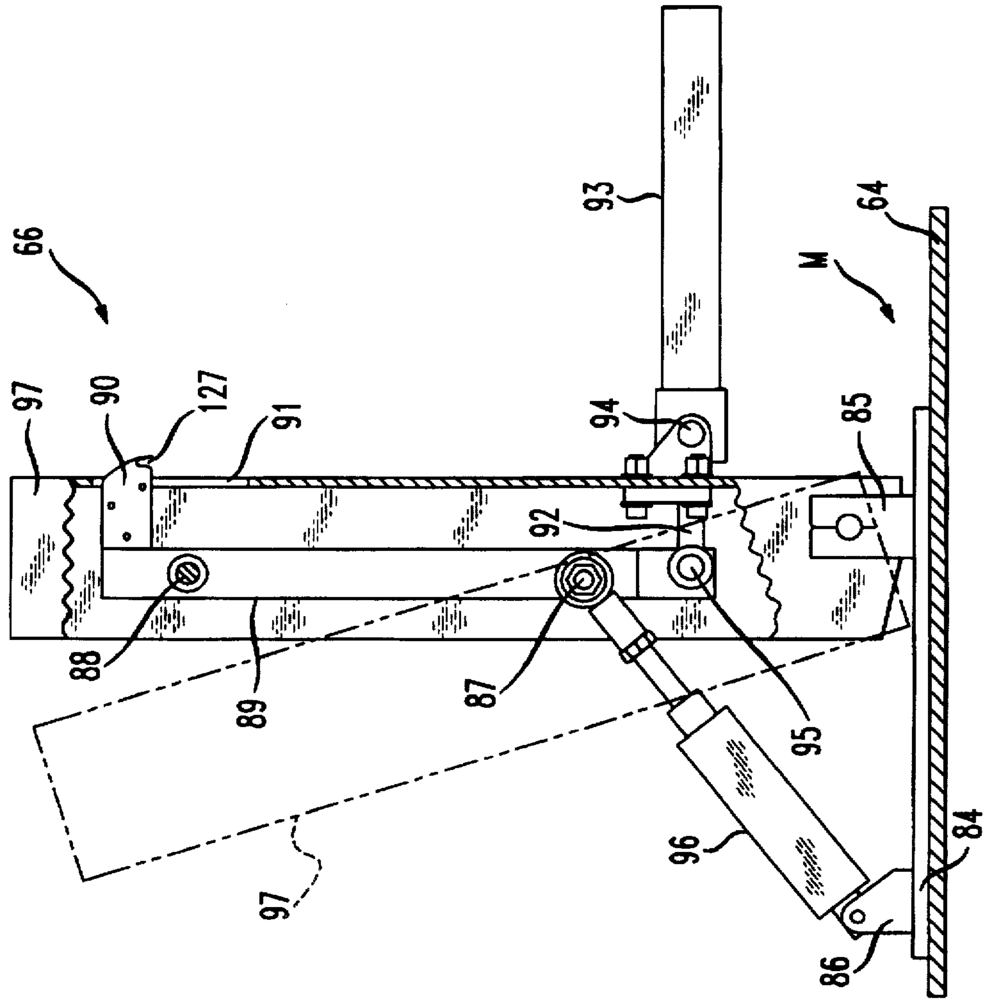
FIG. 20 is a side elevation, with parts in section and parts broken away, of seal-cutter tool 66.
Figure 19:
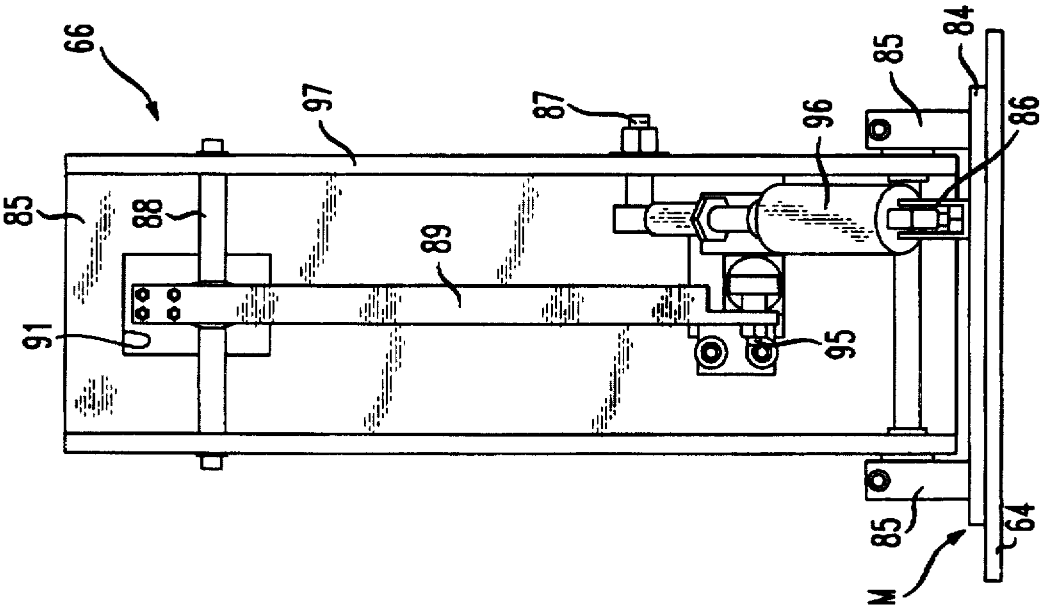
FIG. 19 is a rear elevation of the FIG. 11A seal-cutter tool 66 in accordance with the present invention.
Figure 21:
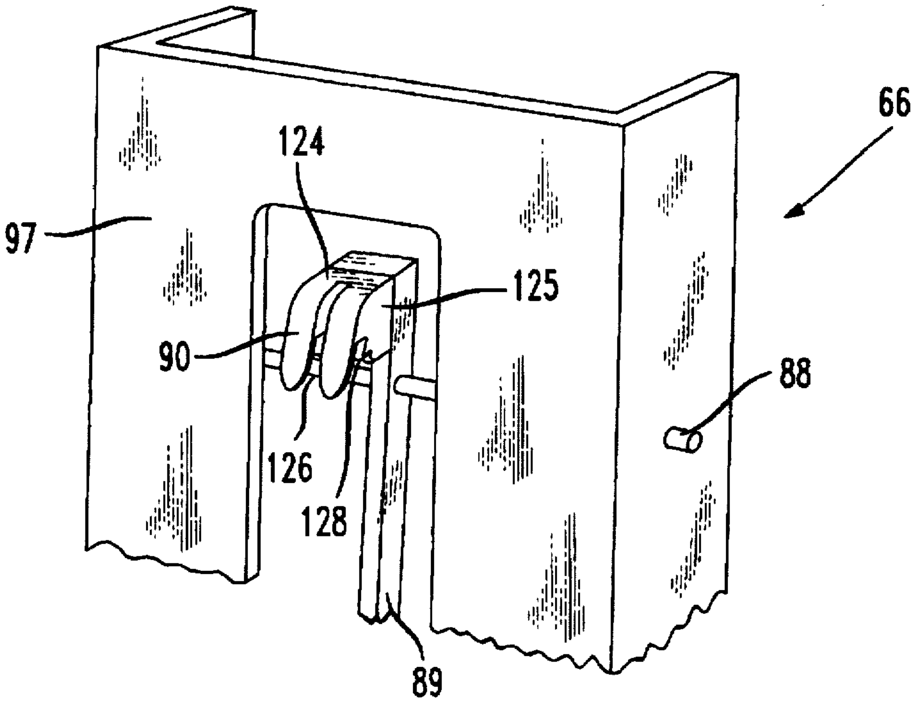
FIG. 21 shows a pictorial view of a portion of seal-cutter tool 66.
Figure 22:
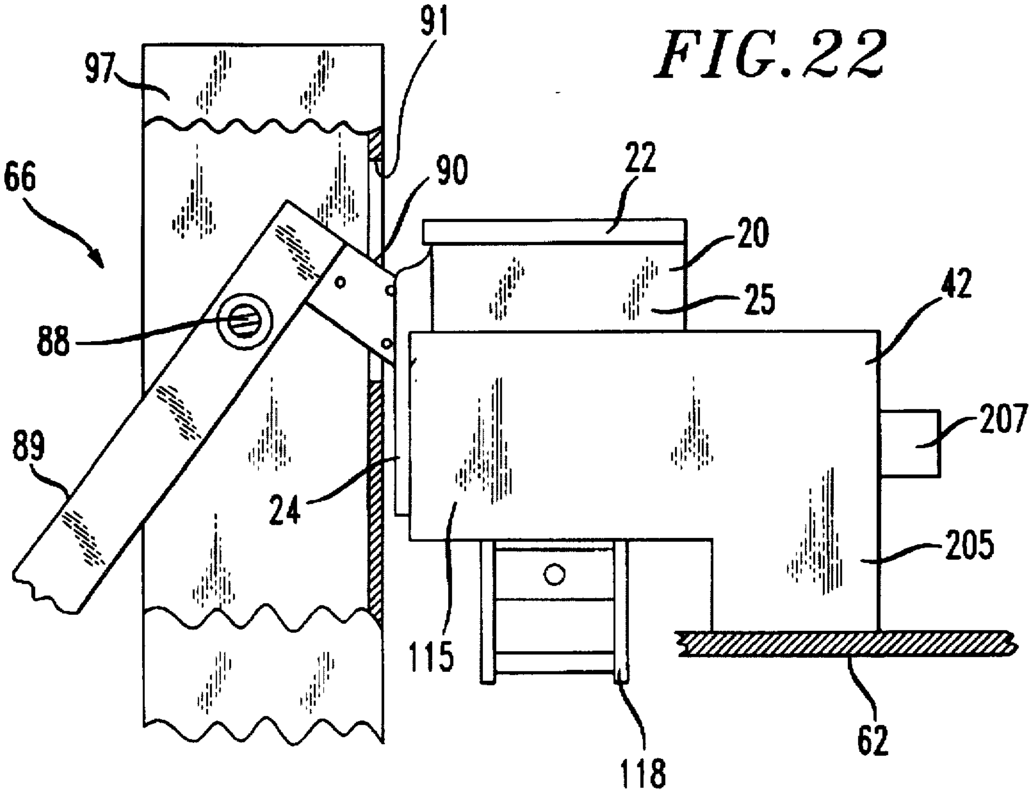
FIG. 22 is a side elevation, with parts in section and parts broken away, of a portion of seal-cutter tool 66.

During each pivot period, seal-cutter tool 66 sits in its retracted position shown in FIG. 25 (see also phantom outline in FIG. 20). At the start of a box period, actuator 96 performs extend-tool STEP 132 by rotating tool channel 97 into the vertical position shown with solid lines in FIG. 20. Next, actuator 93 performs extend-cutter STEP 133 by extending plunger 92 so as to pivot cutter arm 89 about axle 88 thereby rotating cutter 90 out of opening 91 toward seal 40 on front 24 (see FIG. 22). As cutter 90 rotates downward, it captures catch 33 in slot 126, and captures seal 40 in slots 127 and 128. Upon further downward movement of cutter 90, edge 130 shears one side of seal 40 while its other side is forced down by edge 129, thereby cutting seal 40 into two pieces and removing it from the opening in catch 33. Actuator 93 next performs retract-cutter STEP 134 by retracting plunger 92, thereby withdrawing blade 90 back into opening 91. To insure that all pieces of seal 40 are dislodged from catch 33, the cutting steps repeat in extend-cutter STEP 135 and retract-cutter STEP 136. A waste collector (not shown) may be located below table 64 to catch the cut pieces of seals 40. Finally, actuator 96 retracts tool 66 in STEP 137, followed by the next pivot period in which motor assembly 63 rotates dial plate 62 in pivot STEP 120.

As discussed above, actuators 93 and 96 are conventional devices that include sensors 114 for detecting whether or not the associated actuator plunger made a full stroke. Sensors 114 connect to computer system 55 to provide feedback information indicating a failure. In the event of such a failure, computer system 55 may stop the process, enter a failure mode, or take other appropriate corrective action depending on which actuator failed. Such corrective action may include, for example, performing successive retractions and extensions of one or more actuators to free a jammed tool or the like, and/or notify an operator for manual intervention.

FIGS. 27–30 illustrate further details of open-lid tool 67, which mounts at open station N as shown in FIG. 11A. For enhanced understanding, the reader should refer to all these figures throughout the following discussion.

Open-lid tool 67 mounts at open station N on lower table 64 via base plate 140 (see FIGS. 27–30) on which tool channel 141 and one end of actuator 142 pivotally mount. The other end of actuator 142 pivotally connects to channel 141. Actuator 143 has one end pivotally mounted to channel 141 and its other end pivotally connected to one end of arm 144. The other end of arm 144 connects to axle 145. Spring steel loop 147 mounts on axle 145. Axle 145 supports loop 147 adjacent channel opening 146.

FIG. 31 depicts the operation of open-lid tool 67 in the process flow chart for open-lid STEP 103. In particular, when computer system 55 initiates a box period, the computer system invokes raise-loop STEP 150, causing actuator 143 to raise loop 147 from the dashed-line position to the solid-line position, as shown in FIG. 27. STEP 150 is followed by extend-tool STEP 151, which when invoked causes actuator 142 to rotate channel 141 to the vertical position shown in solid lines in FIGS. 28 and 29. FIG. 30 depicts the retracted position of tool 67 as does FIG. 29 through phantom line 148. With the tool raised in this position, loop 147 presses against hasp 34 of box 20. Actuator 143 then lowers loop 147 in lower-loop STEP 152, causing loop 147 to slide down the face of hasp 34 and pass under the free end of this hasp. To insure that loop 147 has indeed captured hasp 34, actuator 142 further extends tool 67 toward box 20 in extend-tool STEP 153. Actuator 143 next rotates axle 145 to raise loop 147 in raise-loop STEP 154. This action will cause hasp 34 to decouple from catch 33, permitting lid 22 to pop up to its neutral position shown in FIG. 3. To insure that hasp 34 and catch 33 decouple, actuator 142 retracts tool 67 while loop 147 is in its raised position through retract-tool STEP 155. Finally, actuator 143 lowers loop 147 in lower-loop STEP 156. Next, computer system 55 performs pivot STEP 120, causing index motor assembly 63 to rotate dial plate 62.

The structures depicted in FIGS. 32–35 relate to rotate-clamp tool 68, shown mounted on upper table 61 at dump station P in FIG. 11A. Rotate-clamp tool 68 performs dump-coins STEP 104 (see FIG. 12), depicted in further detail in FIG. 36. As explained above, rotate-clamp tool 68 assists in removing the contents of a box 20 by inverting that box so that whatever coins are contained therein fall into coin trough 70 and, from there, then into coin sorter/counter system 53. The main process steps invoked by computer system 55 at dump station P are illustrated in the FIG. 36 flowchart, which depicts further details of dump-coins STEP 104. To facilitate understanding, the reader should simultaneously refer to FIGS. 32–36 throughout the following discussion.

Figure 32:
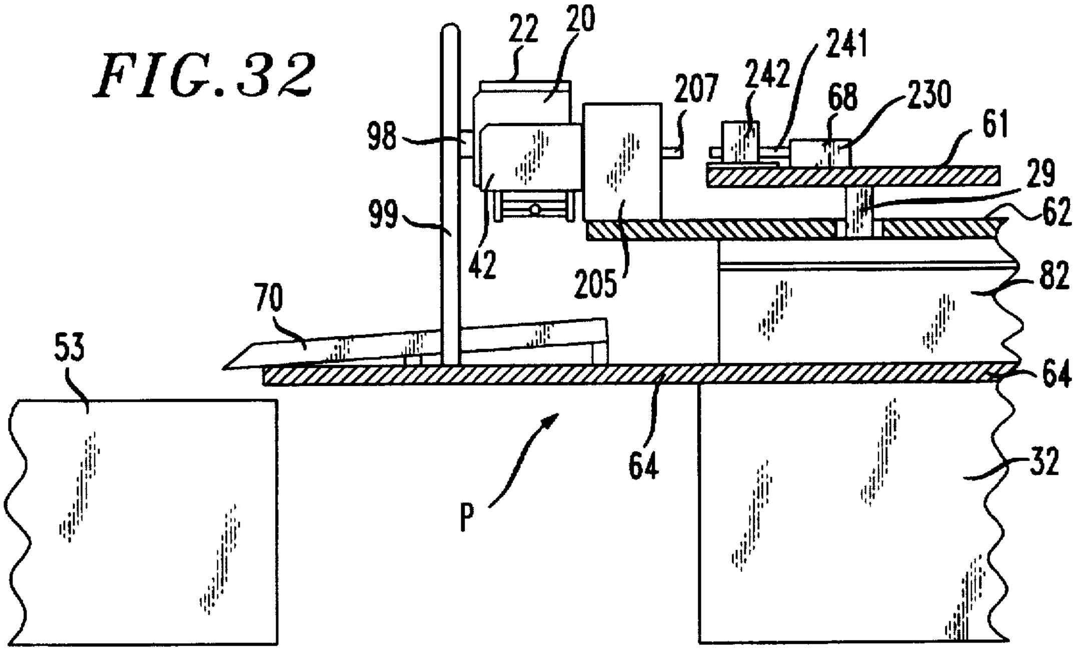
FIGS. 32–35 are side elevations, partly in section, of a portion of the preferred embodiment showing different stages involved in dumping coins from coin boxes 20.
Figure 33:
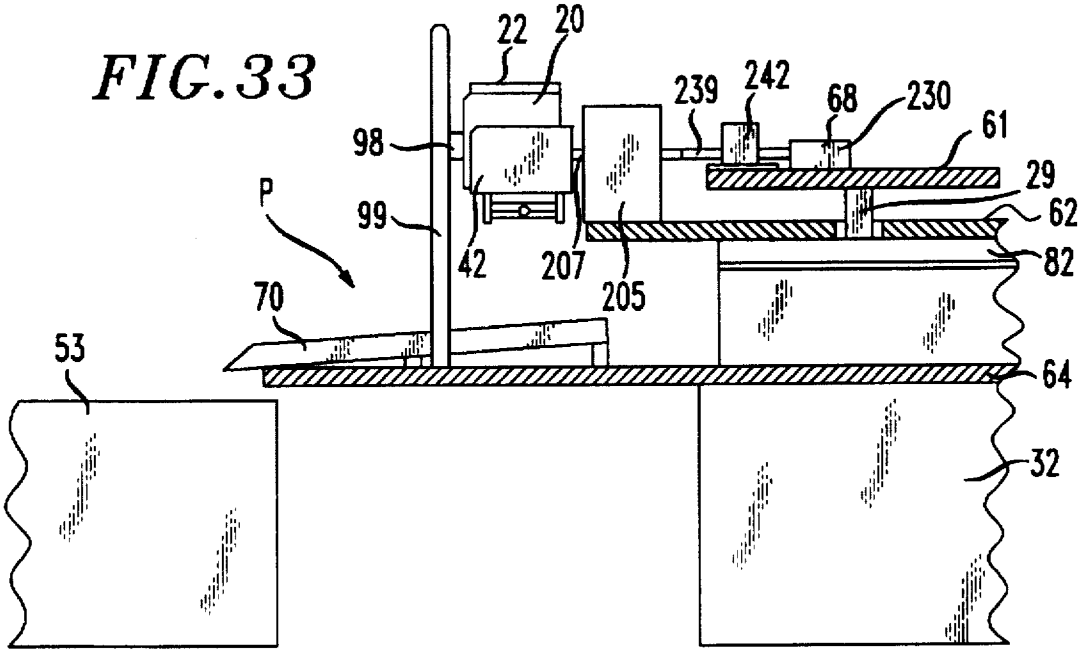
Figure 34:
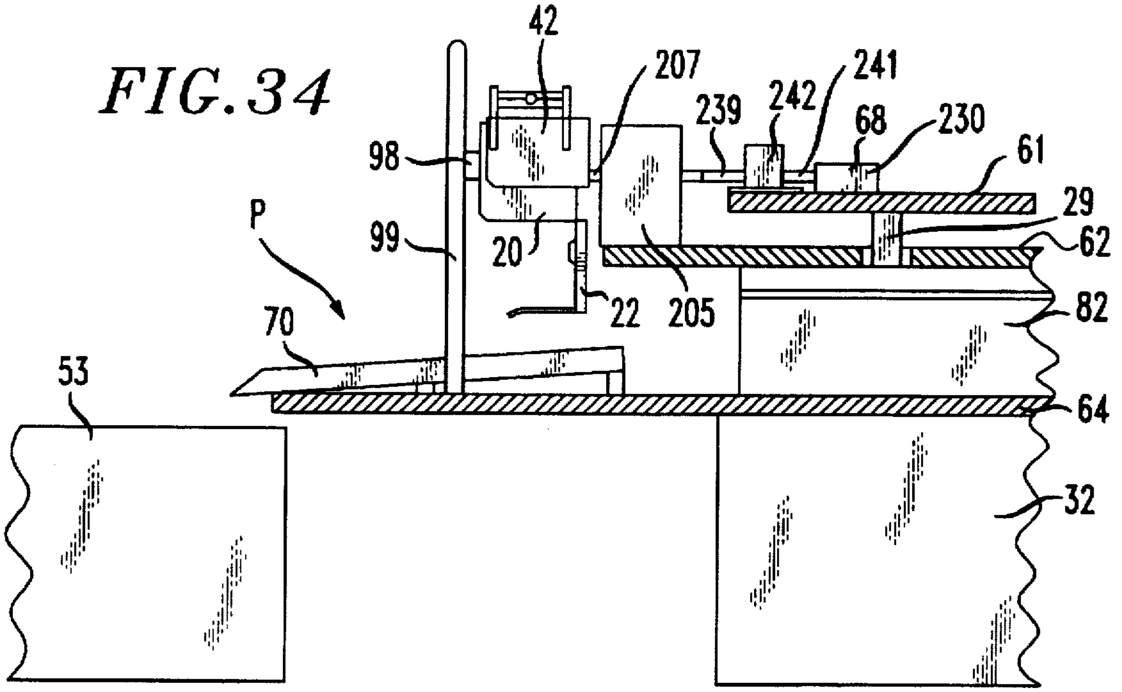
Figure 35:
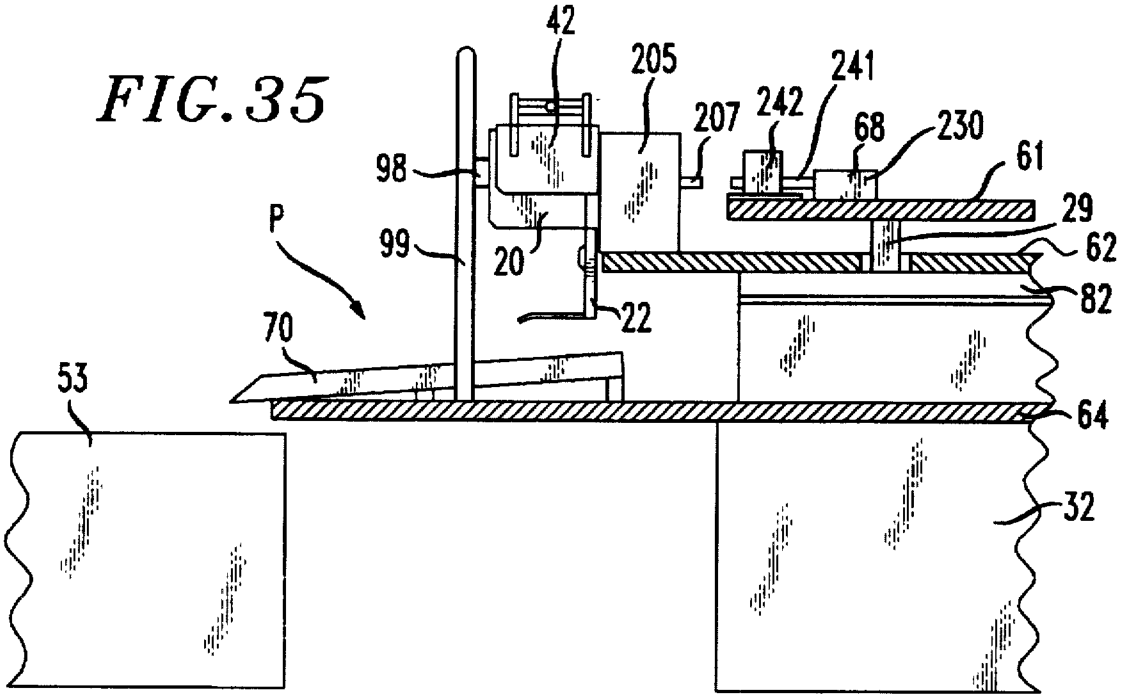
Figure 36:
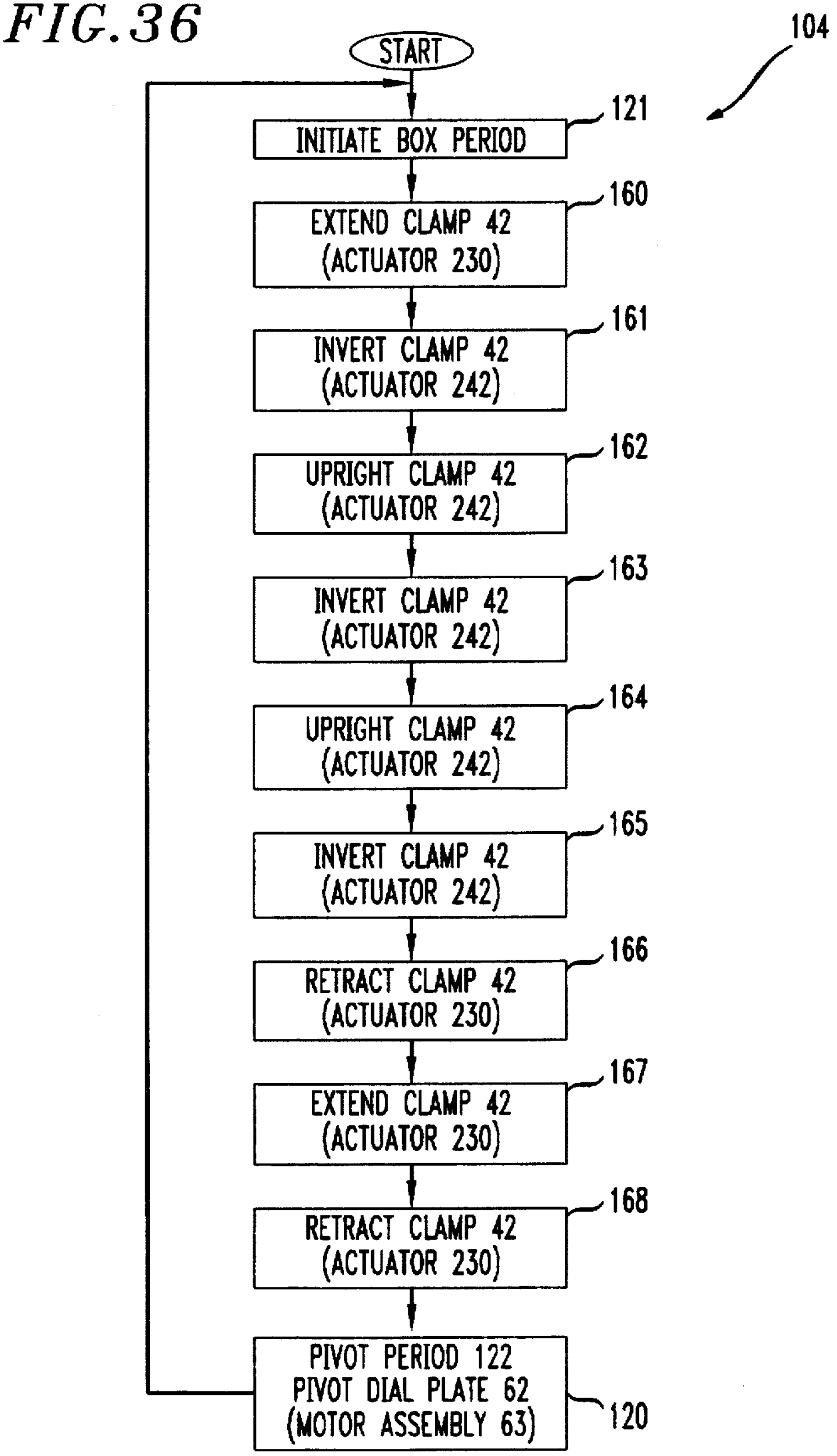
FIG. 36 is a computer flow diagram of further details of dump-coins STEP 104, shown in FIG. 12, illustrating the operations performed in dumping coins from coin boxes 20 into a sorter/counter system.
Figure 37:
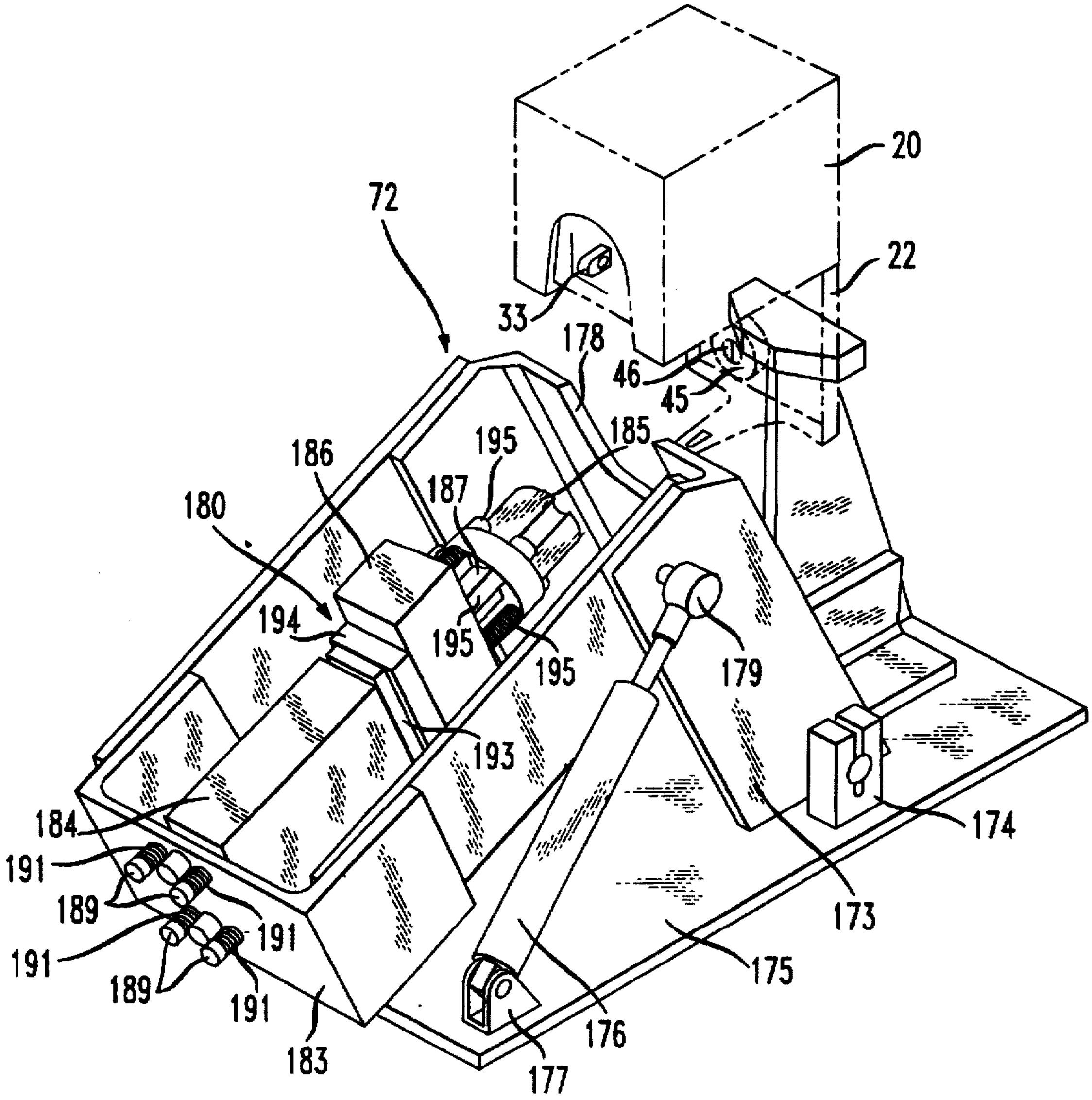
FIG. 37 is a pictorial view of reset-latch tool 72, of FIG. 11A, in its retracted position and having a reset driver in its retracted position in accordance with the present invention.
Figure 38:
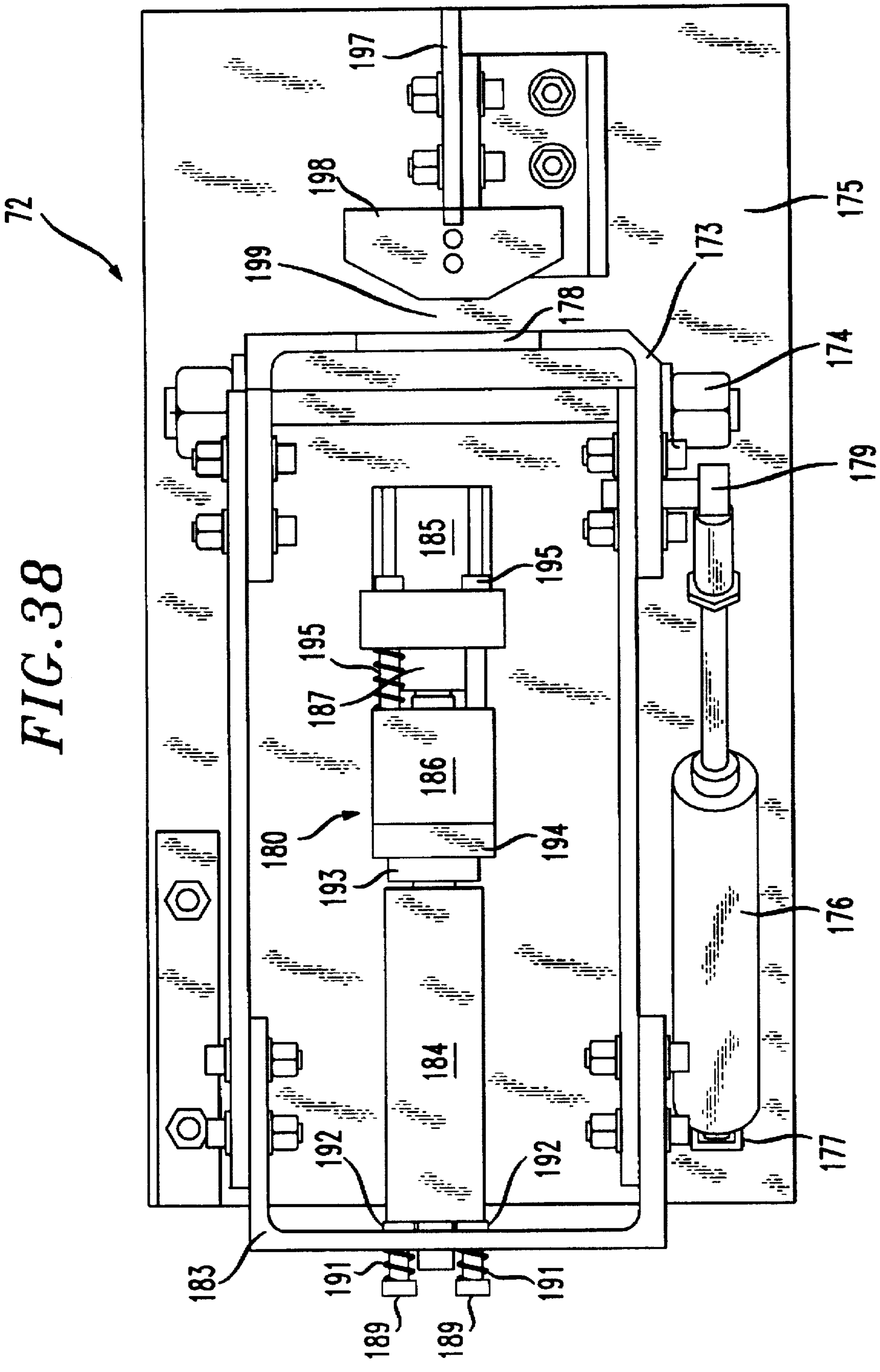
FIG. 38 is a top view of reset-latch tool 72, in which the tool is in its extended position and the reset driver is in its retracted position.

Box 20 arrives at dump station P with its lid 22 in the neutral position, as shown in FIG. 3, and with rotate-clamp tool 68 in its retracted position, as illustrated in FIG. 32. After computer system 55 initiates a box period, the computer system invokes extend-clamp STEP 160, causing actuator 230 to extend clamp 42, via plunger 241 and bolt 207, to the position indicated in FIG. 33. Next, computer system 55 invokes invert-clamp STEP 161, causing rack-and-pinion actuator 242 to rotate plunger 241 and, therefore, bolt 207 which inverts clamp 42 to the position illustrated in FIG. 34. At this point, the coin contents of box 20 pass to sorter/counter system 53 via trough 70. To insure that all coins have fallen from box 20, computer system 55 operates rotate-clamp tool 68 by performing a series of clamp rotations in STEPS 162–165 and, with box 20 inverted as illustrated in FIGS. 34 and 35, a series of extensions and retractions in STEPS 166–168. Before the next pivot period starts in pivot STEP 120, rotate-clamp tool 68 and clamp 42 decouple in retract-clamp STEP 168, leaving box 20 inverted with its lid 22 hanging below body 21 as illustrated in FIG. 35.

FIGS. 37–40 collectively illustrate further details of reset-latch tool 72, which mounts at reset station Q as seen in FIG. 11A. To enhance understanding, the reader should simultaneously refer to FIGS. 37–41 throughout the ensuing discussion.

Specifically, reset-latch tool 72 includes base plate 175, which attaches to lower table 64 at reset station Q. Base plate 175 pivotally supports tool channel 173 via pivot mount 174, and one end of actuator 176 via pivot bracket 177. The other end of actuator 176 pivotally attaches to the upper end of tool channel 173 via pivot joint 179. The upper end of tool channel 173 includes access notch 178 and supports cantilevered mounting bracket 183. Latch resetter 180 includes linear actuator 184, rotary actuator 186, driver 187 and socket guide 185.

Four spring-loaded mounts cantilever one end of latch resetter 180 to the free end of bracket 183. Each spring-loaded mount includes a post 189 which passes through corresponding openings in bracket 183 and fixes to the rear of actuator 184. Each post 189 holds a compression spring 191 between the head of that post and the rear surface of bracket 183. Actuator 184 and bracket 183 sandwich spherical washers 192 which act as pivot spacers therebetween. The cooperation between springs 191 and spherical washers 192 provide compliant movement for latch resetter 180, thereby permitting the resetter to tip slightly as a unit within bracket 183 in response to lateral forces applied thereto. Because the shape and placement of latches 45 varies slightly from one box 20 to another, the compliant movement of latch resetter 180 will aid in successfully mating guide 185 with latch 45 during the resetting process, as described below in further detail.

Plunger 193, of linear actuator 184, connects to one end of rotary actuator 186 via adapter plate 194. The other end of actuator 186 has a rotary shaft 188 which couples to driver 187 for imparting rotary motion thereto. Driver 187 carries actuating blade 190 which protrudes coaxially from the operating end thereof. Actuating blade 190 is shaped to easily fit into the actuating slot in bolt 46 of door latch 45 of lid 22 of coin box 20.

Driver 187 fits within slidable socket guide 185 which telescopically rides on four posts 195 which anchor to the face of actuator 186. Two of the posts 195 carry compression springs for biasing socket guide 185 longitudinally toward access notch 178, i.e., to the right as viewed in FIGS. 38–40.

Socket guide 185 terminates in a tapered port, sized to easily capture door latch 45 while latch resetter 180 guides actuating blade 190 into the actuating slot in bolt 46.

Reset-latch tool 72 also includes lid stop 198, which mounts on base plate 175, via support column 197. Lid stop 198 and the front face of channel 173, when in its vertical position, form lid-holding gap 199. Lid stop 198 lies in a horizontal plane that includes actuating blade 190, when reset-latch tool 72 is extended, and bolt 46 of door latch 45, when gap 199 contains lid 22. Lid stop 198 acts as a back stop for lid 22 when latch 45 is being reset.

Figure 41:
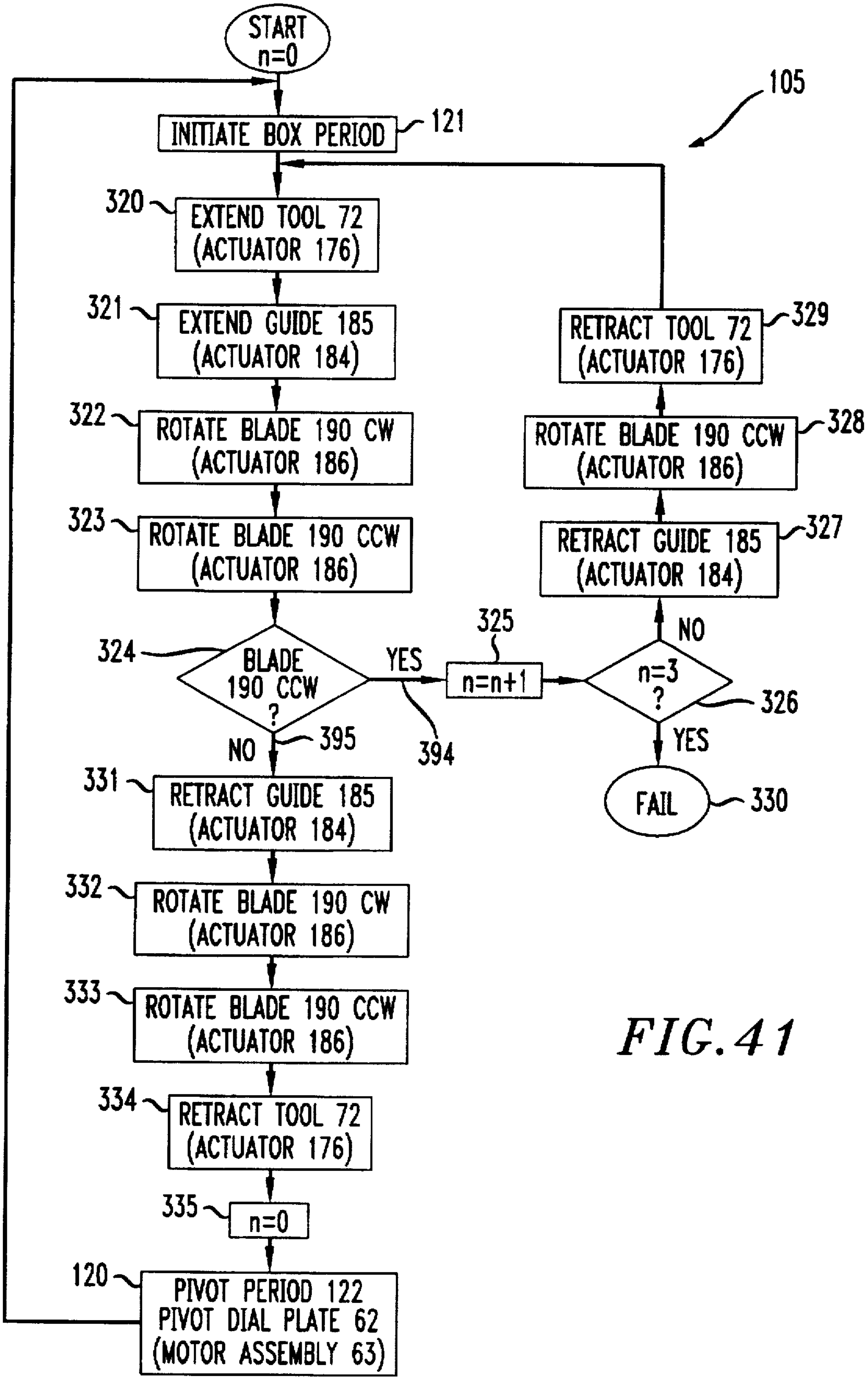
FIG. 41 is a computer flow diagram with further details of reset-latch STEP 105, shown in FIG. 12, illustrating the operation of reset-latch tool 72, of FIGS. 37–40.
Figure 42:
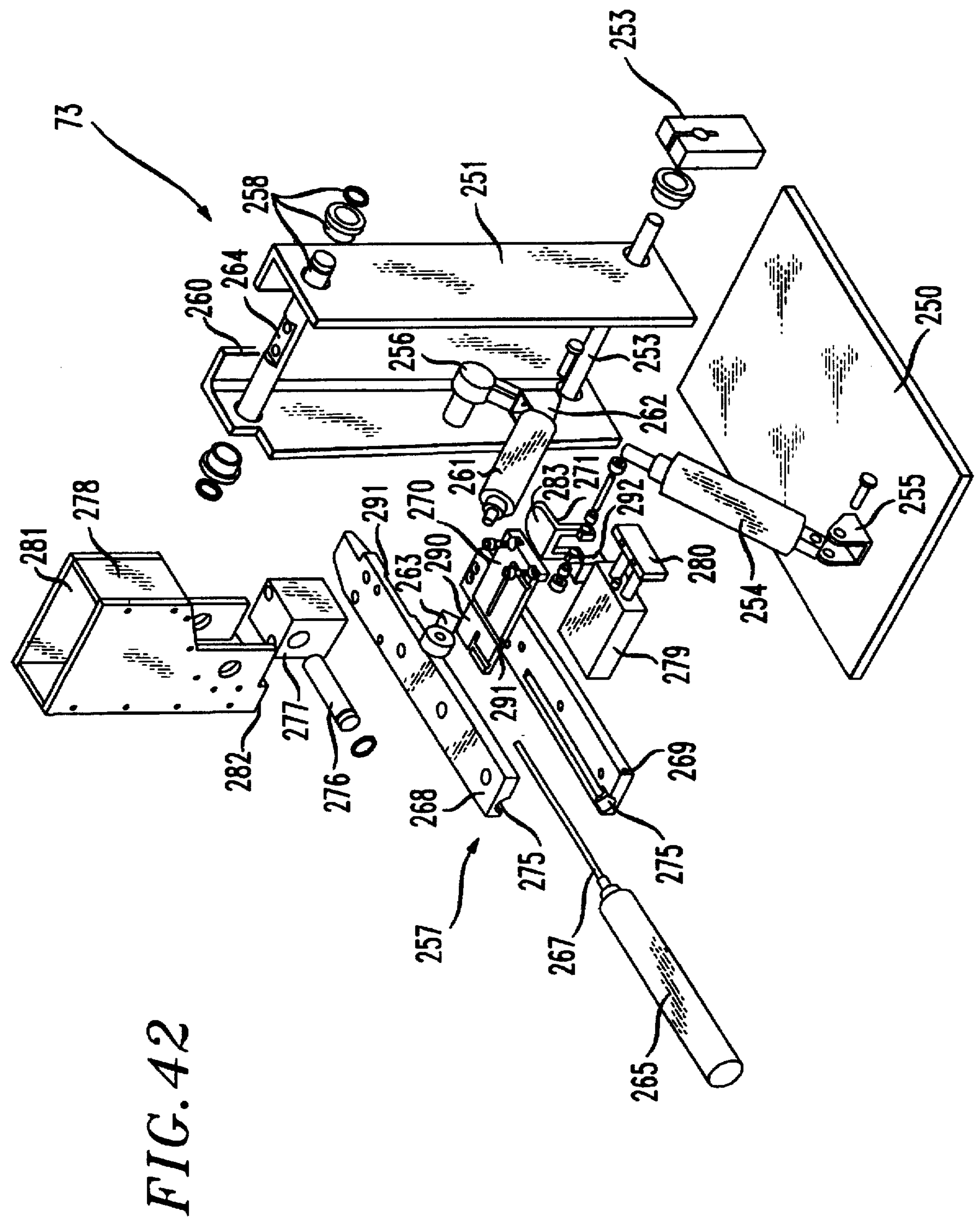
FIG. 42 is an exploded pictorial view of insert-seal tool 73, of FIG. 11A, in accordance with the present invention.
Figure 43:
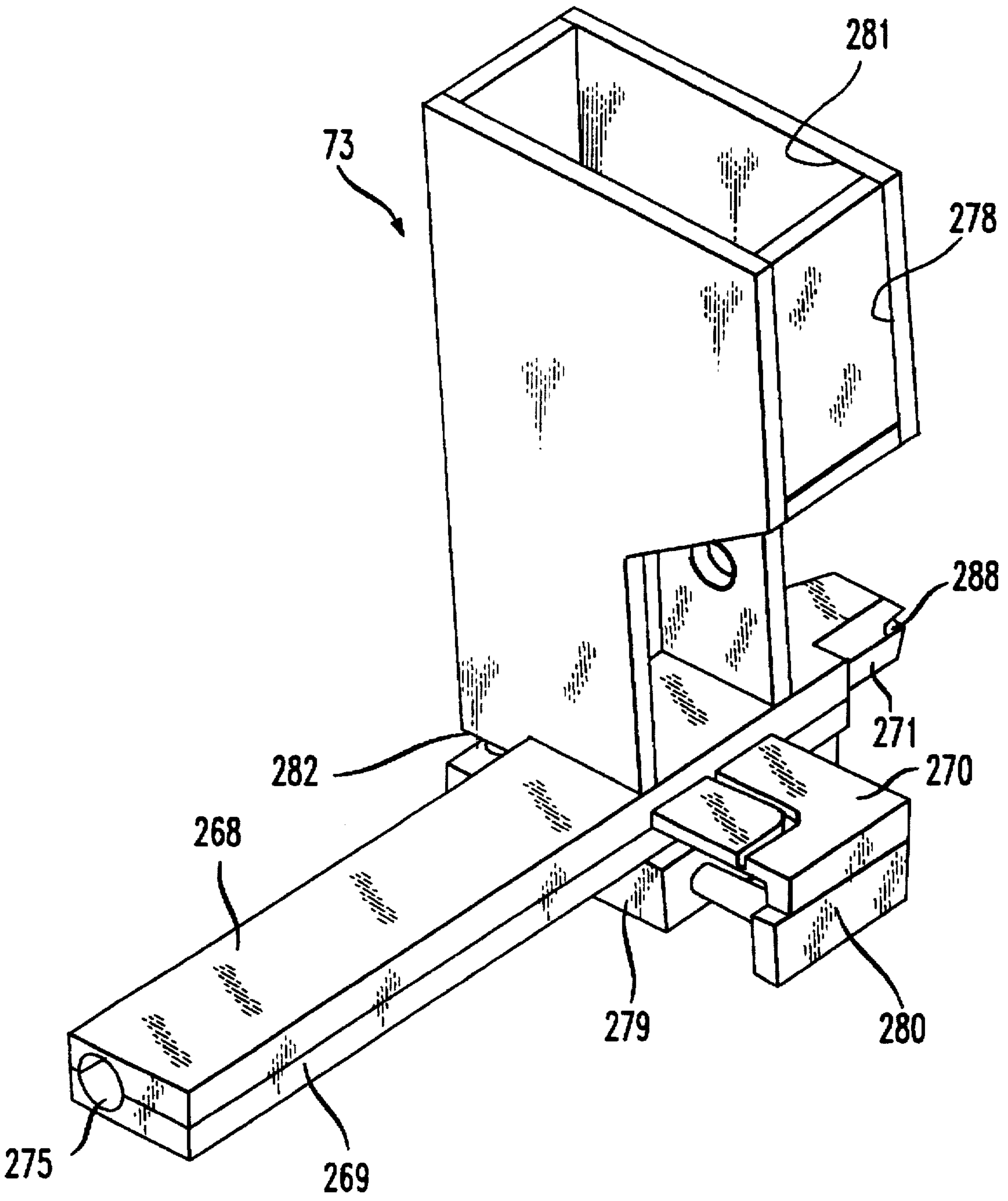
FIG. 43 is a pictorial view looking from the top showing a portion of insert-seal tool 73.

FIG. 41 shows further details of reset-lid STEP 105, which is a part of the flow diagram of FIG. 12. The reader should also simultaneously refer to FIGS. 37–41 throughout the following discussion of reset-lid STEP 105. Reset-lid STEP 105, which includes STEPS 320–335 of FIG. 41, involves a procedure conducted with reset-latch tool 72 during each box period for resetting two-state door latch 45 of lid 22. Execution of pivot STEP 120, during a pivot period, causes a hanging lid 22 of an inverted box 20 to move into gap 199 of reset-latch tool 72 (see FIGS. 38 and 39). Execution of reset-lid STEP 105, during each box period, causes latch resetter 180 to reset two-state door latch 45 in lid 22 by turning bolt 46 from position X to position Y (see FIG. 8).

Upon initiating a box period in STEP 121 (see FIG. 41), computer system 55 invokes reset-lid STEP 105 via extend-tool STEP 320. In STEP 320, actuator 176 extends reset-latch tool 72 from its retracted position (see FIG. 37) into its vertical position (see FIGS. 38 and 39). Next, in extend-guide STEP 321, actuator 184 extends plunger 193, causing rotary actuator 186 and socket guide 185 to move as a unit toward lid 22 (see FIG. 40). As socket guide 185 moves into contact with lid 22, the tapered inner socket of the guide first engages door latch 45. If latch 45 does not align perfectly with socket guide 185, latch 45 imparts lateral forces on the tapered inner surfaces of socket guide 185. In response to these lateral forces, latch resetter 180 tilts as a unit with respect to bracket 183, causing latch 45 to enter socket guide 185 and blade 190 to enter the actuating slot in bolt 46.

Computer system 55 next invokes rotate-blade STEP 322, thereby rotating blade 190 clockwise (CW). This action causes blade 190, of latch resetter 180, to reset the one-way latching mechanism in lid 22 by turning bolt 46 from position X to position Y (see FIG. 8). Once this occurs, and as shown in FIG. 4, computer system 55 then invokes STEPS 323 and 324 to determine if STEP 322 successfully reset lid 22. As explained above, once latch 45 has been reset with pivot bolt 46 in position Y, pivot bolt 46 can be rotated back to position X only by opening door 41. Consequently, in rotate-blade STEP 323, actuator 186 makes an attempt to rotate blade 190 counterclockwise (CCW) back to position X.

If actuator 186 successfully rotates blade 190 CCW in STEP 323, computer system 55 accepts that lid 22 has not been properly reset and exits decision STEP 324 via YES path 394. Computer system 55 now enters a loop in which no more than three more resetting attempts are made as determined by increment STEP 325 and decision STEP 326. Retract-guide STEP 327, rotate-blade STEP 328 and retract-tool STEP 329, when successively invoked, return reset-latch tool 72 to its original position. The process of reset-latch STEP 105 then returns to extend-tool STEP 320 and the loop repeats. After three iterations, computer system 55 enters a fail routine via fail STEP 330, to take appropriate action in view of the failure.

If, however, actuator 186 fails to rotate blade 190 CCW in STEP 323, computer system 55 accepts that lid 22 has been properly reset and exits decision STEP 324 along NO path 395 to retract-guide STEP 331. Blade 190 is then rotated CW and then CCW, in rotate-blade STEPS 332 and 333, respectively. This action insures that actuator 186 has properly reset blade 190 into its starting position. Computer system 55 then invokes retract-tool STEP 334 to cause actuator 176 to retract reset-latch tool 72. Computer system 55 next resets index "n" to zero in STEP 335 and then executes pivot STEP 120.

Figure 51:
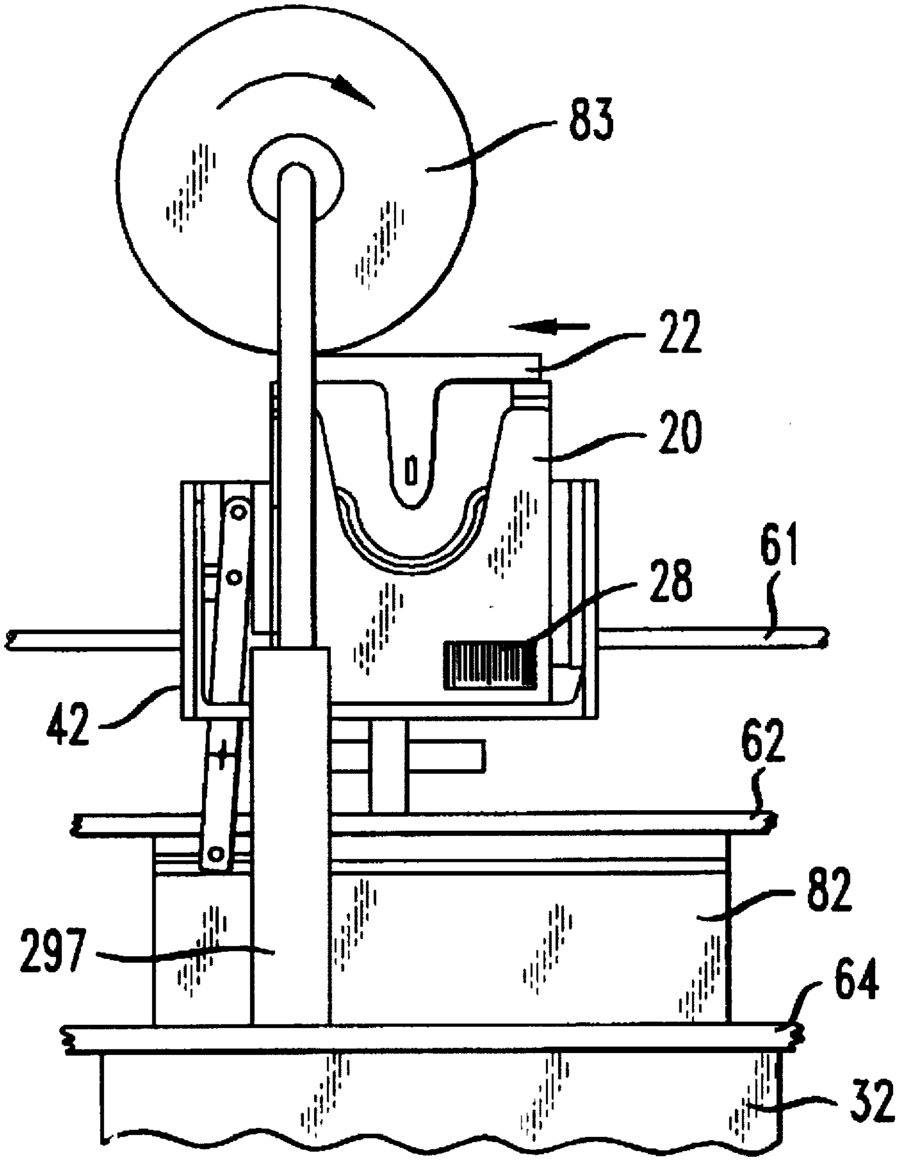
FIG. 51 is an elevation of a box-closing wheel 83 in accordance with the present invention.

As depicted in FIG. 12, during each box period, computer system 55 executes upright-box STEP 106. This step causes rotate-clamp tool 68 (see FIG. 17) located at upright station R to upright box 20 so that this box will be in proper position to have its lid 22 closed during the next pivot period. FIG. 51 illustrates lid 22 being closed while box 20 passes under but in abutting contact with the pivoted wheel 83. Wheel 83, supported by post 297 near an entry side of insert station S, performs this lid-closing process by rolling onto the top surface of lid 22 and forcing it into the closed position of FIG. 1, i.e., with hasp 34 and catch 33 mated.

With lid 22 closed, insert-seal tool 73 inserts seal 40 into the opening in catch 33 of that lid. FIGS. 42–49 illustrate insert-seal tool 73 in detail. For enhanced understanding, the reader should simultaneously refer to FIGS. 42–49 throughout the following discussion of insert-seal tool 73.

Figure 45:
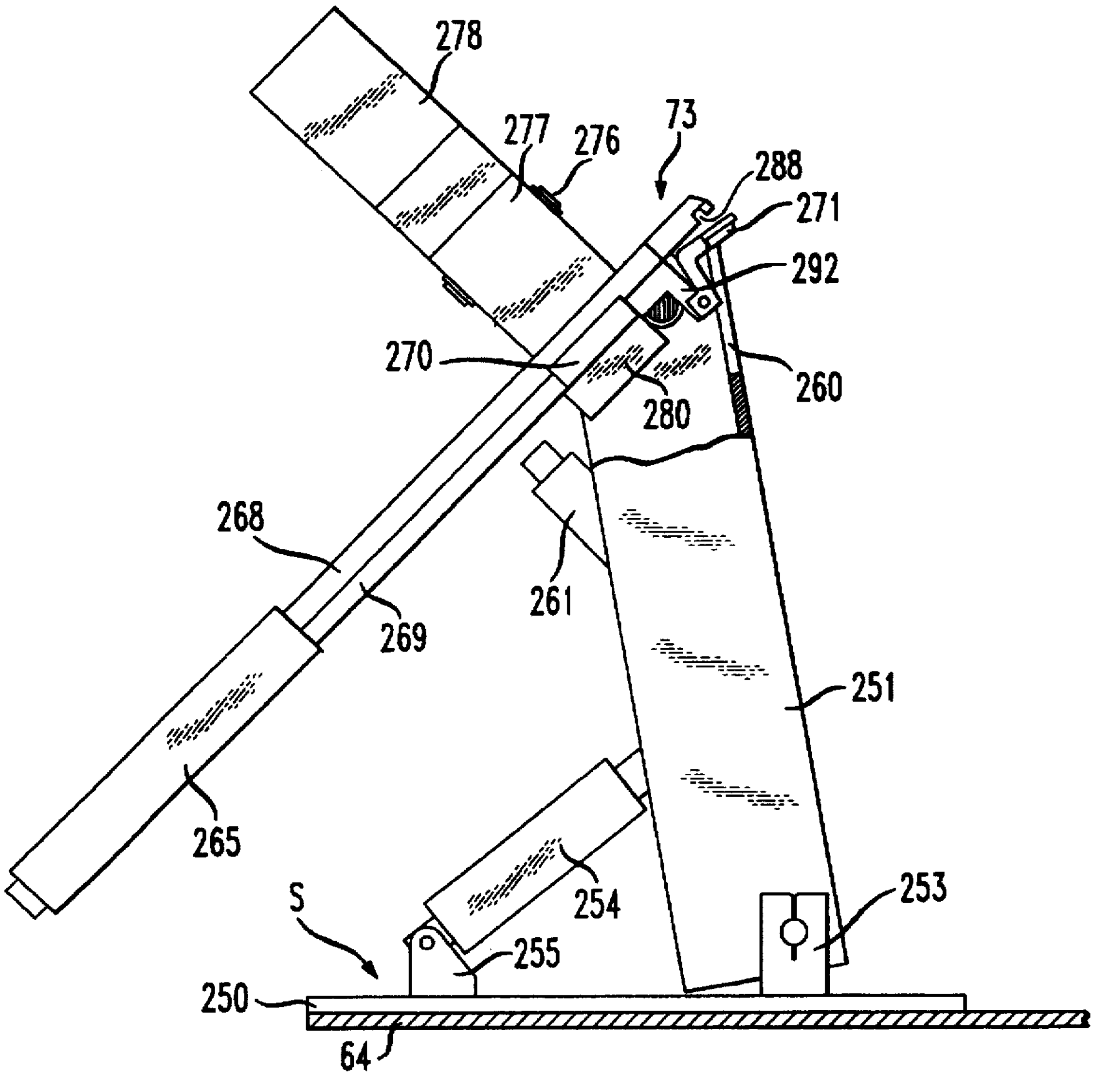
FIG. 45 is a side elevation, with parts broken away, showing insert-seal tool 73 in its retracted position and seal inserter 257 extended.
Figure 46:
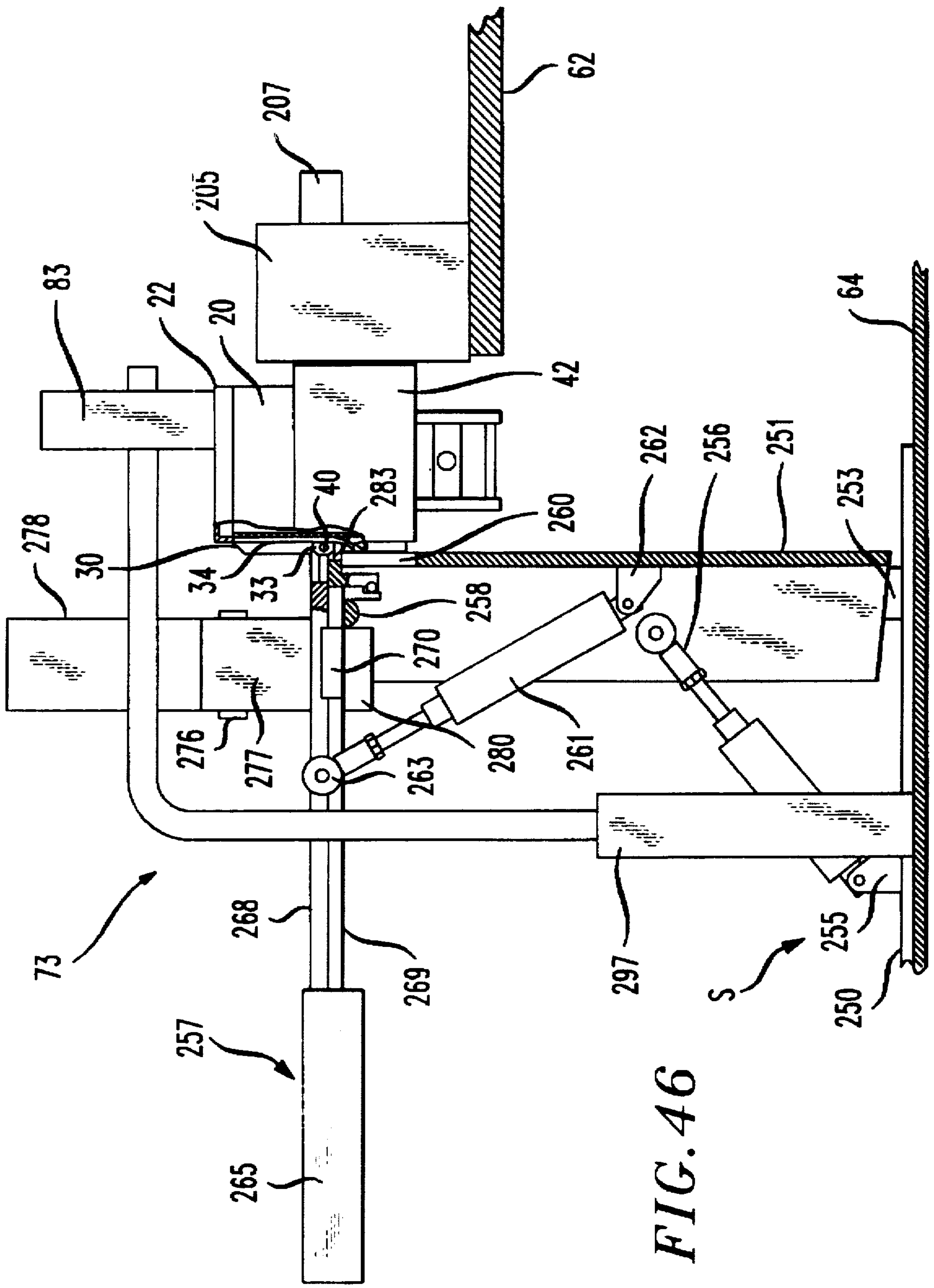
FIG. 46 is a side elevation, with parts broken away, showing insert-seal tool 73 in its extended position.

As shown in FIGS. 45 and 46, base plate 250 mounts insert-seal tool 73 at position S on lower table 64. Base plate 250 pivotally supports tool channel 251, via shaft assembly 253, and one end of actuator 254, via pivot bracket 255. The other end of actuator 254 pivotally connects to channel 251 via ball joint 256. The upper end of channel 251 pivotally supports axle assembly 258 adjacent notch 260. Bearing surface 264, on axle assembly 258, supports one end of bottom casing 269, of seal inserter 257 (see FIGS. 45 and 46). Pivot bracket 262 pivotally connects one end of actuator 261 to channel 251 (see FIG. 46). The other end of actuator 261 pivotally connects to the side of top casing 268 via pivot arm 263.

Seal inserter 257 includes upper casing 268 and lower casing 269 which together form a housing for resilient push pin 267 and seal dispenser 270. The plunger of three-position, linear actuator 265 coaxially supports push pin 267. Three-position linear actuator 265 has a retracted position, a partly extended position and a fully extended position. The rear end of seal inserter 257 holds three-position actuator 265 such that the actuator plunger can extend into longitudinal bore 275, formed in the abutting faces of casings 268 and 269 (see FIG. 47–49). The bottom face of top casing 268 further includes slot 285, which extends axially from bore 275 to transverse slot 291. When actuator 265 is in the retracted position, slots 275 and 285 house push pin 267, as shown in FIG. 48. Still further, the bottom face of top casing 268 includes slot 286 (shown in FIG. 49), which extends axially from tapered entrance port 287 and gradually curves transversely in the plane of top casing 268. As seen in FIGS. 47–49, slots 290, 285 and 286, and push pin 267 lie in a common plane located just above the upper face of bottom casing 269. Slot 286 curves approximately ninety degrees to communicate with exit port 288, which opens toward the side of top casing 268.

Seal inserter 257 further includes seal hopper 278, which mounts on the upper surface of top casing 268, via hopper mount 277 and pin 276. Hopper 278 has input opening 281 and output opening 282. Mount 277 supports hopper 278 directly above the region of seal dispenser 270 with output opening 282 depending over the side of top casing 268. Hopper 278 holds seals 40 such that they are longitudinally oriented, i.e., they extend substantially parallel to dispensing slot 290 of seal dispenser 270.

Casings 268 and 269 sandwich seal dispenser 270 in transverse slot 291. Transverse slot 291, cut into the abutting faces of casings 268 and 269, forms a chamber in which slidable seal dispenser 270 can move in response to actuator 279. Actuator 279 mounts on the bottom surface of bottom casing 269 and connects to one end of seal dispenser 270, via its plunger 280. Seal dispenser 270 also accommodates slots 272 and 273 on either side of dispensing slot 290 (see FIG. 49). Slots 272 and 273 house optical fibers 244 and 245, respectively, which form a part of an optical seal-sensor circuit (see FIG. 11B). Additionally, the regions between slot 290 and fibers 244 and 245 transmit light while seal 40 does not. It is contemplated that seal dispenser 270 be fabricated from transparent plastic while seals 40 are fabricated from opaque plastic.

Diode laser 246, which connects to computer system 55, launches a light beam in optical fiber 244. An input of optical detector 247 connects to optical fiber 245 while an output of optical detector 247 connects to computer system 55. When slot 290 is empty, light radiating from the free end of optical fiber 244 can traverse slot 290 and the adjacent transparent material of seal dispenser 270. As such, this light will enter the free end of optical fiber 245 and be detected by optical detector 247. When slot 290 contains a seal 40, however, the light beam from optical fiber 244 is blocked by that seal, preventing light from reaching optical fiber 245 and being sensed by optical detector 247. Consequently, computer system 55 may now monitor optical detector 247 to determine whether slot 290 is full or empty.

When actuator 265 retracts push pin 267 from slot 290, actuator 279 can retract seal dispenser 270 so that dispensing slot 290 communicates with output opening 282 of hopper 278. If dispensing slot 290 is empty during this operation, that slot will receive a seal 40. Specifically, when actuator 279 retracts seal dispenser 270, dispensing slot 290 moves under output opening 282, permitting a seal 40 to gravitate into slot 290.

When actuator 279 extends seal dispenser 270 so that dispensing slot 290 aligns coaxially with slot 285 and with port 287, actuator 265 can extend push pin 267 into slots 285, 290 and 286. If dispensing slot 290 should contain a seal 40, slots 285, 290 and 286 are aligned, and three-position actuator 265 extends to its partly-extended position, the free end of push pin 267 will move into dispensing slot 290 and engage one end of seal 40, pushing that seal into slot 286 toward, but short of, exit port 288. When three-position actuator 265 extends to its fully extended position, push pin 267 will push the pre-loaded seal 40 in slot 286 out of exit port 288 and into the opening of catch 33 of that box (see FIGS. 46 and 49). Push pin 267 pushes seal 40 into catch 33 to the position shown in FIG. 1.

Figure 44:
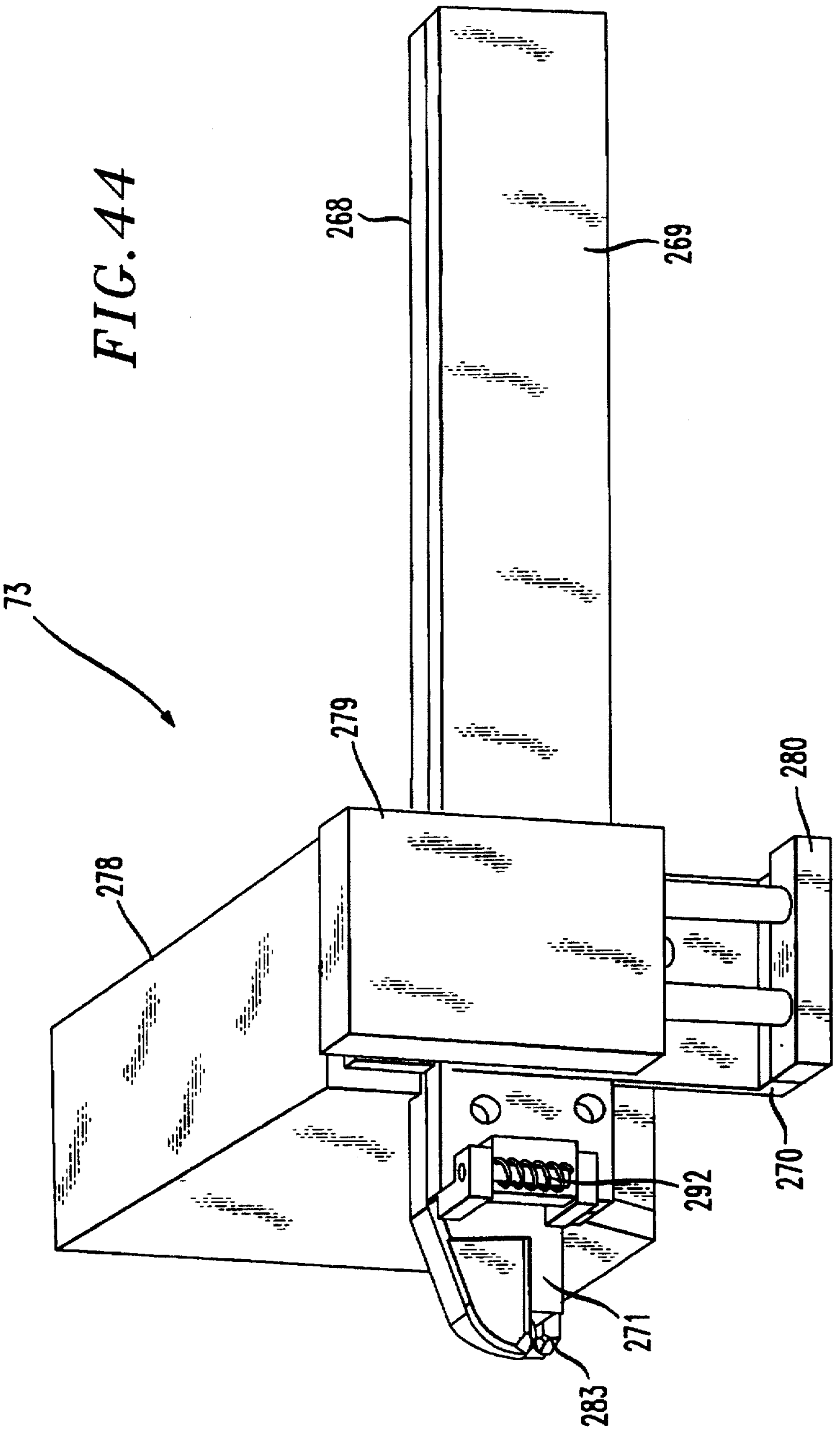
FIG. 44 is a pictorial view looking from the bottom of a portion of insert-seal tool 73.

The muzzle end of seal inserter 257 pivotally supports jaw 271 via spring-biased pivot mount 292. The end of bottom casing 269 connects to pivot mount 292, which biases jaw 271 into engagement with the end of top casing 268, as seen in FIG. 44. The free end of jaw 271 includes tapered slot 283, in which catch 33 resides during seal insertion (see FIG. 46).

Figure 50:
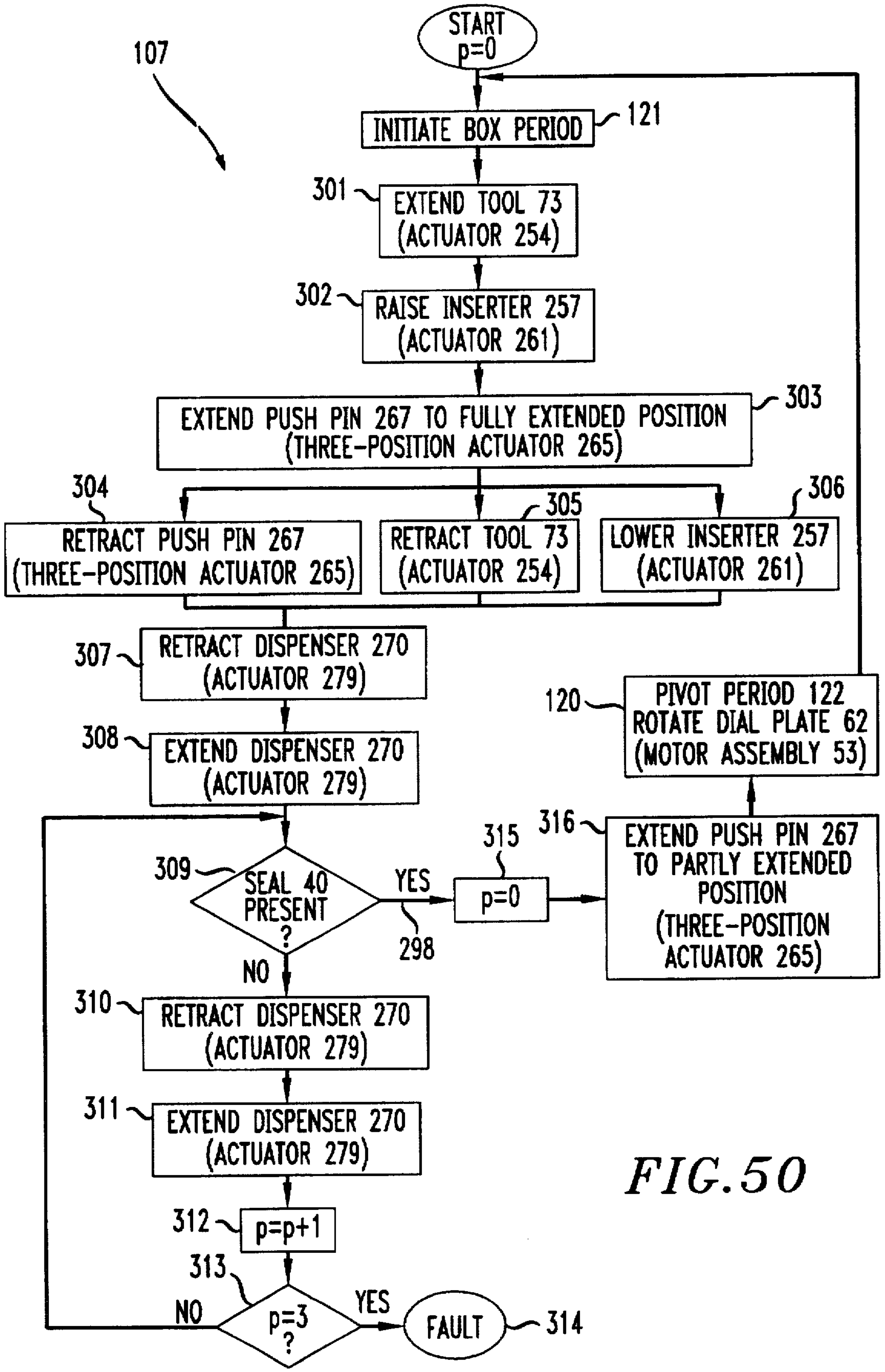
FIG. 50 is a computer flow diagram with further details of insert-seal STEP 107, shown in FIG. 12, illustrating the operation of insert-seal tool 73, of FIGS. 42–49.

FIG. 50 depicts a process flow diagram illustrating details of insert-seal STEP 107, which computer system 55 invokes during a box period, as shown in FIG. 12. As described above, during each pivot period, resilient wheel 83 rolls onto the top surface of lid 22, forcing it into its closed position, depicted in FIG. 1. Additionally, post 297 mounts wheel 83 close enough to insert station S so that it remains in contact with lid 22 during each box period. Consequently, the constant downward pressure of wheel 83 on lid 22 will insure that hasp 34 remains mated with catch 33 during lid-insertion STEP 107.

The reader should refer to FIGS. 42–50 throughout the following detailed discussion of insert-seal STEP 107. At the start of each box period, computer 55 invokes extend-tool STEP 301, causing actuator 254 to extend insert-seal tool 73 into its vertical position. At this time, actuator 261 is in its retracted position, three-position actuator 265 is in its partly extended position, and a seal 40 resides in slot 286. Next, in raise-inserter STEP 302, computer system 55 causes actuator 261 to extend, thereby raising seal inserter 257. This action causes the muzzle end of seal inserter 257 to dip, thereby capturing catch 33 in tapered slot 283 and aligning the opening in catch 33 with exit port 288 (see FIG. 46). Computer system 55 then extends three-position actuator 265, in extend-pin-pusher STEP 303, to its fully extended position. This action causes pin pusher 267 to extend to a fully extended position, driving the pre-loaded seal 40 into the opening of catch 33, via exit port 288, to the position depicted in FIG. 1.

Next, actuators 265, 254, and 261 simultaneously retract in retract-pin-pusher STEP 304, retract-tool STEP 305 and lower-inserter STEP 306, respectively. These actions cause pin pusher 267 to withdraw from dispenser slot 290, and insert-seal tool 73 to retract while inserter 257 lowers to the position shown in FIG. 45. These actions initially cause the muzzle end of top casing 268 to rotate up and away from catch 33. However, the inserted seal 40 in catch 33 prevents jaw 271 from moving along with top casing 268. The result is that jaw 271 separates from the end of top casing 268, as depicted in FIG. 45, permitting the muzzle end of seal inserter 257 and catch 33 to decouple without effecting the inserted seal 40. When catch 33 clears slot 283 (see FIG. 44), jaw 271 rotates upward into engagement with top casing 268.

Computer system 55 then invokes STEPS 307 and 308, in seriatim, making an attempt to load a seal 40 from hopper 278 into dispensing slot 290. Initially, actuator 279 retracts seal dispenser 270, in retract-dispenser STEP 307. Next, actuator 279 extends seal dispenser 270, in extend-dispenser STEP 308. Then in decision STEP 309, computer system 55 monitors optical detector 247 to determine whether or not a seal 40 has been sensed in dispensing slot 290. If no seal 40 is present in dispensing slot 290, computer system 55 enters a loop including STEPS 310–313, in which several attempts are made to load a seal 40 from hopper 278 into dispensing slot 290. Initially, actuator 279 retracts seal dispenser 270, in retract-dispenser STEP 310. Next, actuator 279 extends seal dispenser 270, in extend-dispenser STEP 311, and index "p" increments, in STEP 312. Next, index "p" is tested against the value three, in decision STEP 313. If "p" is less than three, computer system 55 returns to decision STEP 303. However, if computer system 55 has executed three seal-loading loops without successfully loading a seal 40 into dispensing slot 290, computer system 55 enters a fault routine via STEP 314 to invoke appropriate corrective action, e.g., manual intervention.

If, in decision STEP 309, a seal 40 is found to be present in dispensing slot 290, computer system 55 follows YES path 298 to reset index "p" to zero, in STEP 315, and then to extend-pin-pusher STEP 316. In STEP 316, three-position actuator 265 extends to its partly extended position, causing pin pusher 267 to push seal 40, in dispenser slot 290, into slot 286 but not as far as exit port 288. Finally, computer system 55 starts the next pivot period in pivot STEP 120, at which time index motor assembly 63 rotates dial plate 62, clamps 42 shift stations and the next box period is initiated in STEP 121.

As described above and shown in FIG. 11A, a box 20 is unloaded from box processing assembly 52 at position U during each box period. To accomplish this function, position U holds box pusher 76 on upper table 61 and clamp opener 69 on lower table 64. Computer system 55 first causes actuator 80, of clamp opener 69, to retract, so as to open clamp 42, and then causes box pusher 76 to extend, in order to push box 20 from clamp 42. Box pusher 76 pushes box 20 to box-transfer tool 74 which places box 20 in tray 47. Conveyor 60 transports the processed boxes 20 to seal heater 77. In heat-seal STEP 111, shown in FIG. 12, seal heater 77 heats seals 40 to an appropriate seal-setting temperature. As boxes 20 move into position below seal setter 78, seal-setting fingers engage heated seals 40, causing these seals to enlarge their shapes as shown in FIGS. 4, 6 and 10. After completion of set-seal STEP 112, of FIG. 12, coin-box packages 49 pass to the end of conveyor 60 where these packages are then loaded onto transporter 58.

Obviously many modifications and variations of the present invention are possible in the light of the above teachings. For example, those skilled in the art will recognize that the processing capacity of coin-box-processing system 50 may be increased significantly by connecting a plurality of box-processing assemblies 52 and conveyor systems 51 in parallel to computer system 55 and pneumatic system 56, forming several box-processing pipelines that operate in parallel. Additionally, since the tools and actuators mount on tables 61 and 64 in a modular fashion, selected tools may be easily removed and/or repositioned on the tables when adding or changing processing operations. This feature also provides for efficient repair and/or maintenance of tools. For example, seal-cutter tool 66 may be readily replaced with a new or reconditioned tool placed at the adjacent station, or moved from station M to station L without effecting the process.

Still further, the tools and actuators may be easily repositioned or replaced to vary or modify the processing operation when, for example, system 50 is to process a different variety of coin box than that shown in FIG. 1. Additionally, two variations of seal-cutter tool 66, for example, may be placed at adjacent stations, such as stations L and M. In this instance, each variation of seal-cutter tool 66 may correspond to different variations of box 20. Based on a determination of the specific box variation located in a specific clamp 42 by reading bar-code label 28 for the box in that clamp, computer system 55 could activate the appropriate seal-cutter tool 66 when the corresponding box 20 is at that station. Consequently, multiple variations of the various tools may also be mounted on a particular box-processing assembly 52 to provide process flexibility. It will also be recognized by skilled artisans that coin-box-processing system 50 may be provided with enlarged tables 61 and 64, and dial plate 62, to accommodate an increased number of stations with additional tools and corresponding box clamps 42 without effecting the process throughput.

Specific improvements and variations in the operation of some of the tools will also become evident from the foregoing description. For example, trough 70 may be pivoted and controlled by an actuator to assume two different positions. In a first position, trough 70 would lie relatively flat, acting as both a receptacle for receiving dumped coins and an inspection tray for permitting manual inspection of the dumped coins for slugs, foreign matter and the like. The actuator may then tilt trough 70 upward so that it acts as a chute for passing the coins into sorter/counter system 53.

Still further, computer system 55 may be programmed to process only selected boxes by operating only selected tools and actuators during the pipeline process. This feature may be important when it is desirable that system 50 not process boxes having certain bar-code numbers or no bar-code label, or a specific clamp 42 does not contain a box 20. For example, in response to laser scanner 75 failing to successfully read a bar-code label 28 for a specific clamp 42, either because the label is damaged or that clamp is empty, computer system 55 may be programmed not to activate the corresponding tools as that clamp passes through the pipeline.

Obviously, many other modifications are contemplated and may obviously be resorted to by those skilled in the art. It is to be understood, therefore, that within the scope of the appended claims, the invention may be practiced otherwise than as specifically described.

What is claimed is:

1. A reset tool for resetting a one-way latch on a coin-collection box, said one-way latch having a set state and a locking state, said latch including a pivoted actuating bolt to reset said latch from said locking state to said set state, said reset tool comprising:

- a tool frame;
- a latch resetter mounted on said tool frame, said latch resetter having a reset means for resetting said one-way latch; and
- an actuator means for moving said latch resetter into engagement with said box.

2. The tool of claim 1 wherein said reset means includes a socket guide capable of capturing said one-way latch, and a shift means for shifting said one-way latch from said locking state to said set state.

3. The tool of claim 2 wherein said shift means has a reset head mounted in said socket guide, said reset head capable of mating with said actuating bolt.

4. The tool of claim 3 wherein said actuator means includes a linear actuator and a rotary actuator, said reset head connects to said rotary actuator, said rotary actuator connects to said linear actuator, and a spring-loaded support mounting said linear actuator on said tool frame to provide compliant movement for said reset head with respect to said one-way latch.

5. The tool of claim 4 wherein said socket guide is spring loaded and telescopically slides over said reset head.

6. The tool of claim 5 wherein said reset head includes a blade capable of mating with said bolt.

7. The tool of claim 6 further including a motive means connected to said actuator means for activating said actuator means, and a computer means for controlling said motive means.

8. The tool of claim 7 wherein said computer means causes said reset head to move said bolt in one direction to shift said one-way latch from said locking state to said set state, and causes said reset head to attempt to move said bolt in another direction to determine if said one-way latch has been set into said set state.

9. The tool of claim 8 wherein said computer means causes said reset head to move said bolt in a plurality of cycles, including movement in said one direction followed by movement in said another direction, until said one-way latch remains in said set state.

10. The tool of claim 9 further including a stop means for supporting said one-way latch while said reset head engages said bolt.

11. The tool of claim 10 wherein said actuator means retracts said tool frame away from said stop means and extends said tool frame toward said stop means.

12. A reset tool for resetting a one-way latch on a coin-collection box, said one-way latch including a pivoted actuating bolt to reset said latch, said reset tool comprising:

a base;

a tool frame pivotally mounted on said base;

a first actuator means connected to said tool frame for rotating said tool frame with respect to said base to move said reset tool into operative engagement with said box;

a latch resetter having a reset means for resetting said one-way latch; and a spring-loaded support mounting said latch resetter to said frame.

13. The tool of claim 12 further including a second actuator means for moving said latch resetter into operative engagement with said one-way latch.

14. The tool of claim 13 further including a third actuator means connected to said reset means for activating said reset means to reset said one-way latch.

15. The tool of claim 14 wherein said second actuator means includes a linear actuator, and said spring-loaded support mounts said linear actuator to said tool frame to provide compliant movement for said reset means with respect to said one-way latch.

16. The tool of claim 15 wherein said reset means includes a blade, and said third actuator means includes a rotary actuator connected to said linear actuator and to said blade.

17. The tool of claim 16 wherein said latch resetter includes a socket guide spring loaded and telescopically mounted over said blade, said socket guide capable of capturing said one-way latch.

18. The tool of claim 17 further including a motive means connected to said first, second and third actuator means for activating said first, second and third actuator means, and a computer means for controlling said motive means.

19. The tool of claim 18 wherein said computer means causes said blade to move said bolt in a plurality of cycles, including movement in one direction followed by movement in another direction, until said one-way latch remains in said set state.

20. The tool of claim 19 further including a stop means for supporting said one-way latch while said blade engages said bolt.

21. A method of resetting a one-way latch on a coin-collection box, said one-way latch including a pivoted actuating bolt to reset said latch, said method comprising:

mounting a latch resetter with compliant movement on a tool frame, said latch resetter including a socket guide capable of capturing said one-way latch, and a shift means for shifting said one-way latch from said locking state to said set state;

moving said socket guide into engagement with said one-way latch while said latch resetter makes compliant movements to cause said socket guide to capture said one-way latch;

coupling said shift means to said pivoted actuating bolt; and rotating said actuating bolt via said shift means to shift said one-way latch form said locking state to said set state.

22. The method of claim 21 wherein said shift means includes a blade and said socket guide is spring loaded to telescopically slide over said blade, and said step of moving said socket guide into engagement with said one-way latch includes moving said latch resetter with respect to said tool frame and sliding said socket guide with respect to said blade.

23. The method of claim 22 wherein said step of rotating said actuating bolt includes moving said actuating bolt in one direction to shift said one-way latch from said locking state to said set state, and attempting to move said actuating bolt in another direction to determine if said one-way latch has been set into said set state, and moving said bolt in a plurality of cycles, including movement in said one direction followed by movement in said another direction, until said one-way latch remains in said set state.

* * * * *